United States Patent
Kim et al.

(10) Patent No.: US 12,489,912 B2
(45) Date of Patent: Dec. 2, 2025

(54) CACHING PICTURES FOR VIDEO CODING

(71) Applicant: QUALCOMM Incorporated, San Diego, CA (US)

(72) Inventors: Giwon Kim, San Diego, CA (US); Shengqi Yang, Carlsbad, CA (US); Younghoon Kim, San Diego, CA (US); George Patsilaras, San Diego, CA (US); Jaemoon Kim, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 159 days.

(21) Appl. No.: 18/337,109

(22) Filed: Jun. 19, 2023

(65) Prior Publication Data
US 2024/0422335 A1    Dec. 19, 2024

(51) Int. Cl.
*H04N 19/423* (2014.01)
*H04N 19/105* (2014.01)
(Continued)

(52) U.S. Cl.
CPC ......... *H04N 19/423* (2014.11); *H04N 19/105* (2014.11); *H04N 19/109* (2014.11);
(Continued)

(58) Field of Classification Search
CPC .. H04N 19/423; H04N 19/105; H04N 19/109; H04N 19/136; H04N 19/172; H04N 19/503; H04N 19/51; H04N 19/433
See application file for complete search history.

(56) References Cited

U.S. PATENT DOCUMENTS 8,593,469 B2    11/2013  Sriram et al.
9,253,496 B2 *   2/2016  Nagaraj ............... H04N 19/423
(Continued)

FOREIGN PATENT DOCUMENTS

CN    113360687 A    9/2021
CN    115918071 A    4/2023
WO    WO-2023198753 A1    10/2023

OTHER PUBLICATIONS

International Search Report and Written Opinion—PCT/US2024/032045—ISA/EPO—Aug. 5, 2024 (15 pp).
(Continued)

*Primary Examiner* — Richard A Hansell, Jr.
(74) *Attorney, Agent, or Firm* — Shumaker & Sieffert, P.A.

(57) ABSTRACT

A method includes generating a plurality of future reference picture lists associated with a plurality of future pictures of a set of pictures, wherein the set of pictures includes a current picture and the plurality of future pictures, and the plurality of future pictures follow the current picture in coding order, determining, based on information derived from the plurality of future reference picture lists associated with the plurality of future pictures, whether to write the current picture in a dedicated chip memory or whether to write the current picture in a non-dedicated system memory, and writing the current picture in the dedicated chip memory or the non-dedicated system memory based on the determination of whether to write the current picture in the dedicated chip memory or whether to write the current picture the non-dedicated system memory.

25 Claims, 11 Drawing Sheets

(51) Int. Cl.
  *H04N 19/109* (2014.01)
  *H04N 19/136* (2014.01)
  *H04N 19/172* (2014.01)
  *H04N 19/503* (2014.01)

(52) U.S. Cl.
  CPC ......... *H04N 19/136* (2014.11); *H04N 19/172* (2014.11); *H04N 19/503* (2014.11)

(56) References Cited

U.S. PATENT DOCUMENTS

| | | | |
|---|---|---|---|
| 9,264,717 | B2 | 2/2016 | Chen et al. |
| 10,516,891 | B2 | 12/2019 | Lee et al. |
| 10,542,276 | B2 * | 1/2020 | Qiu ...................... H04N 19/423 |
| 10,708,605 | B2 | 7/2020 | He et al. |
| 11,496,747 | B2 | 11/2022 | Zhang et al. |
| 11,595,667 | B2 | 2/2023 | Zhou et al. |
| 2008/0279280 | A1 * | 11/2008 | Iguchi .................... H04N 19/61 375/E7.123 |
| 2010/0150223 | A1 | 6/2010 | Nagaraj ................ H04N 19/70 375/E7.076 |
| 2014/0348226 | A1 | 11/2014 | Kurashige |
| 2017/0006303 | A1 * | 1/2017 | Sethuraman ........... H04N 19/58 |
| 2017/0064309 | A1 | 3/2017 | Sethuraman et al. |
| 2017/0150159 | A1 * | 5/2017 | Lee ........................ H04N 19/52 |
| 2017/0188033 | A1 | 6/2017 | Lin et al. |
| 2018/0139461 | A1 * | 5/2018 | Liu ....................... H04N 19/159 |
| 2018/0376149 | A1 | 12/2018 | Zhang et al. |
| 2019/0289319 | A1 | 9/2019 | Mukherjee et al. |
| 2023/0054524 | A1 | 2/2023 | Yang et al. |
| 2023/0199171 | A1 | 6/2023 | Hsiao et al. |
| 2023/0336716 | A1 | 10/2023 | Chang et al. |
| 2024/0422336 | A1 * | 12/2024 | Kim ....................... H04N 19/51 |

OTHER PUBLICATIONS

Co-pending U.S. Appl. No. 18/337,116, inventor Kim; Younghoon, filed Jun. 19, 2023.

Huang X., et al., "Improved Downstream Rate-Distortion Performance of SHVC in DASH using Sub-Layer-Selective Interlayer Prediction", 2015 IEEE 17th International Workshop on Multimedia Signal Processing (MMSP), Oct. 2015, 6 pages.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Itu-T H.266: "Series H: Audiovisual and Multimedia Systems Infrastructure of Audiovisual Services—Coding of Moving Video", Versatile Video Coding, The International Telecommunication Union, Aug. 2020, 516 pages.

* cited by examiner

CACHING PICTURES FOR VIDEO CODING

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for determining whether to write a current picture in dedicated chip memory (e.g., cache) or non-dedicated system memory (e.g., random access memory (RAM)). A video encoder or video decoder may generate future reference picture lists associated with future pictures (e.g., pictures that follow the current picture in coding order), and based on information derived from the future reference picture lists, the video encoder or video decoder may determine whether to write the current picture in the dedicated chip memory or the non-dedicated system memory. The video encoder and the video decoder may then access the current picture form the dedicated chip memory or the non-dedicated system memory if the current picture is used for inter-predicting another picture.

Accessing a picture from dedicated chip memory may require less bandwidth and power, as compared to accessing a picture from non-dedicated system memory. By utilizing information derived from the future reference picture lists, the video encoder or video decoder may determine an estimate of how frequently or likely the current picture is going to be accessed in the future as a reference picture for inter-predicting another picture. By determining to write pictures that are estimated to more frequently be accessed as reference pictures in dedicated chip memory, the example techniques may reduce power and bandwidth consumption due to more frequent accesses of the dedicated chip memory and reduced accesses of the non-dedicated system memory.

In one example, the disclosure describes a method of processing video data, the method comprising: generating a plurality of future reference picture lists associated with a plurality of future pictures of a set of pictures, wherein the set of pictures includes a current picture and the plurality of future pictures, and the plurality of future pictures follow the current picture in coding order; determining, based on information derived from the plurality of future reference picture lists associated with the plurality of future pictures, whether to write the current picture in a dedicated chip memory or whether to write the current picture in a non-dedicated system memory; and writing the current picture in the dedicated chip memory or the non-dedicated system memory based on the determination of whether to write the current picture in the dedicated chip memory or whether to write the current picture the non-dedicated system memory.

In one example, the disclosure describes a device for processing video data, the device comprising: a dedicated chip memory; and processing circuitry coupled to the dedicated chip memory and configured to: generate a plurality of future reference picture lists associated with a plurality of future pictures of a set of pictures, wherein the set of pictures includes a current picture and the plurality of future pictures, and the plurality of future pictures follow the current picture in coding order; determine, based on information derived from the plurality of future reference picture lists associated with the plurality of future pictures, whether to write the current picture in the dedicated chip memory or whether to write the current picture in a non-dedicated system memory; and write the current picture in the dedicated chip memory or the non-dedicated system memory based on the determination of whether to write the current picture in the dedicated chip memory or whether to write the current picture in the non-dedicated system memory.

In one example, the disclosure describes one or more computer-readable storage media storing instructions that when executed cause one or more processors to: generate a plurality of future reference picture lists associated with a plurality of future pictures of a set of pictures, wherein the set of pictures includes a current picture and the plurality of future pictures, and the plurality of future pictures follow the current picture in coding order; determine, based on information derived from the plurality of future reference picture lists associated with the plurality of future pictures, whether to write the current picture in a dedicated chip memory or whether to write the current picture in a non-dedicated system memory; and write the current picture in the dedicated chip memory or the non-dedicated system memory based on the determination of whether to write the current picture in the dedicated chip memory or whether to write the current picture the non-dedicated system memory.

In one example, the disclosure describes device for processing video data, the device comprising: means for generating a plurality of future reference picture lists associated with a plurality of future pictures of a set of pictures, wherein the set of pictures includes a current picture and the plurality of future pictures, and the plurality of future pictures follow the current picture in coding order; means for determining, based on information derived from the plurality of future reference picture lists associated with the plurality of future pictures, whether to write the current picture in a dedicated chip memory or whether to write the current picture in a non-dedicated system memory; and means for writing the current picture in the dedicated chip memory or the non-dedicated system memory based on the determination of whether to write the current picture in the dedicated chip memory or whether to write the current picture the non-dedicated system memory.

The details of one or more examples are set forth in the accompanying drawings and the description below. Other features, objects, and advantages will be apparent from the description, drawings, and claims.

DETAILED DESCRIPTION

Figure 1:
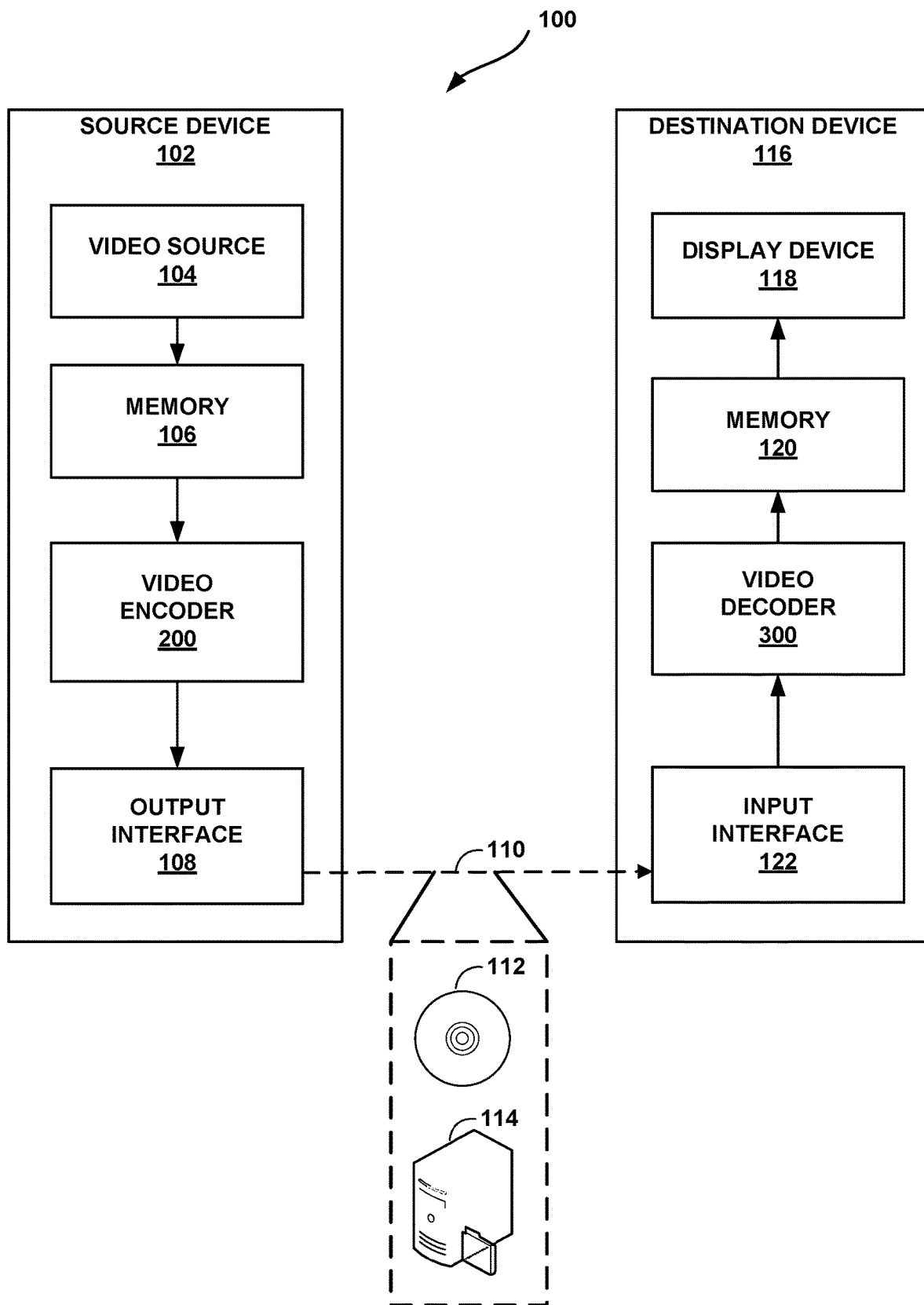
FIG. 1 is a block diagram illustrating an example video encoding and decoding system that may perform the techniques of this disclosure.

Inter-prediction is an example video encoding or decoding technique for encoding or decoding a current block in a current picture. In inter-prediction, a video encoder or video decoder determine a reference block in a reference picture. The video encoder or video decoder may generate a prediction block from the reference block (e.g., by filtering, etc.). In some examples, the prediction block and reference block are the same blocks. The video encoder determines residual information indicative of a difference between samples of the prediction block and the current block, and signals the residual information. The video decoder receives the residual information, and adds the residual information to the prediction block to reconstruct the current block. The video decoder may perform similar operations to reconstruct the current picture.

The video encoder and video decoder write the current picture to memory. The current picture can then be a reference picture for encoding or decoding one or more future pictures. Future pictures refer to pictures that follow the current picture in coding order (i.e., are encoded or decoded after the current picture).

For the video encoder or video decoder, there may be different types of memory that are available for writing the current picture. For instance, an integrated circuit (IC) chip that includes the video encoder and/or video decoder may have dedicated chip memory, which may be on-chip or off-chip and accessible by a dedicated bus. The dedicated chip memory may be shared by components of the IC chip, but may not be accessible by other chips. One example of the dedicated chip memory is cache memory. The dedicated chip memory is one example of memory to which the video encoder or video decoder may write the current picture.

Also, the system that includes the IC chip may include non-dedicated system memory. For instance, the IC chip may be part of a larger system (e.g., phone, tablet, laptop, etc.), and there may be system memory that is shared by the components of the system, and need not be dedicated to the IC chip. Random access memory (RAM) is an example of non-dedicated system memory. The non-dedicated system memory is another example of memory to which the video encoder or video decoder may write the current picture.

In general, writing and reading from the dedicated chip memory requires less power and access time compared to writing and reading from the non-dedicated system memory. Therefore, there may be benefit in writing the current picture in dedicated chip memory so that if the current picture is used as a reference picture, the current picture can be read more quickly and with less power than if the current picture were stored in non-dedicated system memory. However, there may be a limit to the memory size of the dedicated chip memory, and the dedicated chip memory is typically smaller than non-dedicated system memory. The dedicated chip memory may not be sized to store a large number of many pictures. In some cases, the dedicated chip memory may be able to store one picture.

This disclosure describes example techniques for determining whether to write the current picture in the dedicated chip memory or the non-dedicated system memory. For instance, the video encoder and the video decoder may determine metrics indicative of how frequently the current picture is predicted to be used as a reference picture for future pictures, and how frequently a cached picture (i.e., a picture already stored in the dedicated chip memory) is predicted to be used as a reference picture for future pictures. Based on the determined metrics, the video encoder and video decoder may determine whether to write the current picture in the dedicated chip memory or the non-dedicated system memory.

In one or more examples, to determine metrics of how frequently a picture is predicted to be used as a reference picture, the video encoder and the video decoder may determine reference picture lists for future pictures. A reference picture list includes a list of candidate reference pictures that the video encoder and the video decoder construct using similar techniques. There may be one or more reference picture lists. In some examples, the video encoder and the video decoder may each construct two reference picture lists, referred to as list 0 and list 1. Simply for ease of description, this disclosure describes the example techniques with list 0 and list 1. However, the example techniques are not limited to having two reference picture lists. The example techniques are appliable to having one reference picture list or more than two reference picture lists.

The video encoder signals an index value for one or both of list 0 and list 1 to identify one reference picture (e.g., for uni-prediction) or two reference pictures (e.g., for bi-prediction). The video decoder receives the index value(s) to determine the reference picture for the current picture.

The construction of the reference picture lists may not occur until the timing of encoding or decoding the current picture. That is, the video decoder may not have information from the video encoder of how to construct the reference picture list(s) for pictures following the current picture in coding order at the time the video decoder is reconstructing the current picture.

In one or more examples, the video encoder and the video decoder may generate a plurality of future reference picture lists associated with a plurality of future pictures of a set of pictures. The set of pictures includes the current picture and the plurality of future pictures, and the plurality of future pictures follow the current picture in coding order.

As one example, the set of pictures may be a second set of pictures. The video decoder may generate, based on a first set of pictures coded prior to the second set of pictures, a plurality of future reference picture lists associated with the plurality of future pictures. The second set of pictures include the current picture and the plurality of future pictures, and the plurality of future pictures follow the current picture in decoding order. The first set of pictures and the second set of pictures may include a predefined number of pictures.

As one example, the first set of pictures may be referred to a first group of pictures (GOP), and the second set of pictures may be referred to as a second GOP. As another example, the first set of pictures and the second set of pictures may be defined as pictures whose reference picture is required to be a picture in the respective set of pictures. For instance, a reference picture for a picture in the second set of pictures is required to be within the second set of pictures. As another example, a first instantaneous decoder refresh (IDR) picture and a second IDR picture may define ends of the first set of pictures and the second set of pictures, and the first set of pictures may be the first half of pictures between the first IDR picture and the second IDR picture, and the second set of pictures may be the second half of the pictures between the first IDR picture and the second IDR picture.

In some examples, there is a relatively high likelihood that there are certain similarities between reference picture lists of pictures in the first set of pictures and reference picture lists of pictures in the second set of pictures. For instance, there is a likelihood that the video sequence has a repetitive set of pictures with a fixed period. As one example, the relative distance between a picture in the first set of pictures, and respective pictures in the reference picture lists for the picture in the first set of pictures may be same as a co-located picture in the second set of pictures, and respective pictures in the reference picture lists for the picture in the second set of pictures.

As an example, assume that a first entry in list 0 for a sixth picture, in the first set of pictures in coding order, identifies a picture that is two pictures earlier in coding order in the first set of pictures. In this example, a first entry in list 0 for a sixth picture, in the second set of pictures in coding order, is likely to identify a picture that is two pictures earlier in coding order in the second set of pictures. It is possible, but may be less likely, that the first entry in list 0 for the sixth picture, in the second set of pictures in coding order, is not the picture that is two pictures earlier in coding order in the second set of pictures. This similarity may apply to the other entries in the list 0 and list 1 for the sixth picture, and the other pictures in the first set of pictures and the second set of pictures.

In this example, assume that the current picture is the second picture in the second set of pictures. Even though the sixth picture in the second set of pictures is yet to be decoded (i.e., the sixth picture is a future picture), the video decoder may be able to generate reference picture lists for the sixth picture in the second set of pictures based on the reference picture lists for the sixth picture in the first set of pictures. Because the video decoder had already decoded the pictures in the first set of pictures, the reference picture lists for the sixth picture in the first set of pictures is available to the video decoder.

Accordingly, in one or more examples, to generate the plurality of future reference picture lists, the video decoder may determine respective previous pictures in the first set of pictures (e.g., sixth picture in first set of pictures in above example) located in a same relative location in the first set of pictures that the plurality of the future pictures are located in the second set of pictures (e.g., sixth picture in the second set of pictures in above example). The video decoder may determine respective reference picture lists for the respective previous pictures (e.g., first entry for list 0 for the sixth picture in the first set of pictures in above example). The video decoder may generate respective plurality of future reference picture lists for each of the plurality of future pictures based on the determined respective reference picture lists for the respective previous pictures (e.g., generate list 0 for the sixth picture in the second set of pictures based on list 0 for the sixth picture in the first set of pictures).

The video encoder may generate the plurality of future reference picture lists associated with the plurality of future pictures using similar techniques of those described above for the video decoder. However, because the video encoder is tasked with determining which pictures are included in a reference picture list, the video encoder may not need to generate the plurality of future reference picture lists in the second set of pictures based on the reference picture lists of previous pictures in the first set of pictures. That is, the video encoder may generate a plurality of future reference picture lists associated with a plurality of future pictures of a set of pictures using techniques similar to those of the video decoder or different techniques.

From the perspective of the video decoder, the future reference picture lists may be a prediction of the actual future reference picture lists because it is possible that the actual future reference picture lists end up being different than the future preference picture lists that the video decoder determined. From the perspective of the video encoder, the future reference picture lists may be determined and known, and not necessarily a prediction. Accordingly, in one or more examples, the plurality of future reference picture lists may be predicted (e.g., for the video decoder) or determined (e.g., for the video encoder) future reference picture lists that identify pictures usable as reference pictures for the plurality of future pictures.

With the future reference picture lists, the video encoder and the video decoder may derive information (e.g., one or more metrics) from the future reference picture lists. For instance, the video encoder and the video decoder may determine which pictures are identified at different entries in list 0 and list 1 for the future pictures. In some examples, the video encoder and the video decoder may determine which reference pictures are identified in the first entry (e.g., index 0) and the second entry (e.g., index 1) in list 0 and list 1 for the future pictures. In one or more examples, reference pictures identified in the first entry of list 0 and list 1 are most likely to be used as reference pictures, and reference pictures identified in the second entry of list 0 and list 1 are next most likely to be used as reference pictures.

The video encoder and the video decoder may determine different metrics based on a number of times a particular reference picture is identified in the first entry of list 0 for the future pictures, first entry of list 1 for the future pictures, second entry of list 0 for the future pictures, and second entry of list 1 for the future pictures, as one example. The video encoder and the video decoder may utilize these metrics to determine whether to write the current picture in dedicated chip memory or non-dedicated system memory.

For instance, the video encoder and the video decoder may determine a first metric, referred to as a first reference benefit value, for the current picture, and also determine a second metric, referred to as a second reference benefit value, for the cached picture (i.e., the picture currently stored in the dedicated chip memory). If the first reference benefit value is greater than the second reference benefit value, the video encoder and the video decoder may flush out the cached picture from the dedicated chip memory, write the current picture in the dedicated chip memory, and write the cached picture to the non-dedicated system memory. If the first reference benefit value is less than the second reference benefit value, the video encoder and the video decoder may write the current picture in the non-dedicated system memory. In general, the reference benefit value may be a prediction of how often the current picture or the cached picture is going to be used as a reference picture.

For ease of description, the above example is described with respect to using the reference pictures identified in the first and second entries of list 0 and list 1 of the future pictures. However, the example techniques are not so limited. In some examples, the video encoder and the video decoder may determine the reference benefit value based on only list 0 or list 1, and/or only one entry in list 0 or list 1. In some examples, the video encoder and the video decoder may determine reference benefit values based on more entries than the first entry and the second entry, or on more reference picture lists.

The number of entries of future reference picture lists and/or the number of future reference picture lists that are evaluated may be based on balancing complexity. For example, it may be possible that evaluating more entries than the first and second entries in list 0 and list 1 of future pictures provides a more accurate measure of the reference benefit value as compared to evaluating only the first and second entries in list 0 and list 1 of future pictures. However, evaluating more entries than the first and second entries in list 0 and list 1 of future pictures may require additional processing time. Determining whether to write the current picture in dedicated chip memory or non-dedicated system memory based on future reference picture lists associated with future pictures may be beneficial, and the number of entries in the future reference picture lists that are evaluated may be based on desired complexity level, and the examples are consistent with the techniques described in this disclosure.

Also, the above example techniques are described with respect to the dedicated chip memory storing one picture. However, the example techniques are not so limited. In some examples, the dedicated chip memory may store a plurality of pictures. In such examples, the video encoder and the video decoder may compare the reference benefit values for the current picture and one or more of the cached pictures. If the reference benefit value for the current picture is greater than the reference benefit value of the cached picture having the least reference benefit value, the video encoder and the video decoder may flush out the cached picture having the least reference benefit value from the dedicated chip memory, write the current picture in the dedicated chip memory, and write the cached picture to the non-dedicated system memory.

Some other techniques rely upon evaluating motion vectors of future pictures to determine whether to write the current picture in dedicated chip memory or non-dedicated system memory. A motion vector points to a location in a reference picture from where the prediction block is generated. In these other techniques, before decoding a future picture, the video decoder may receive information for motion vectors for the future picture. The video decoder may then parse the information for motion vectors before decoding the future picture to determine whether to write a picture in dedicated chip memory or non-dedicated system memory.

However, there may not be a guarantee that information for motion vectors for future pictures is available. Also, the video decoder may need to expend resources parsing information from the bitstream for future pictures that is not useful for the current picture. With the example techniques described in this disclosure, the video decoder may be able to determine future reference picture lists based on already decoded pictures, and the video decoder may not need to rely upon parsing information that may not be available or expending resources parsing information that is not needed.

Some other techniques also rely upon reference picture sets (RPS). A reference picture set is different than a reference picture list. The reference picture set includes information for which pictures may be part of the reference picture list, but it may not be necessary for all pictures in a reference picture set to be part of a reference picture list. These other techniques that rely on the reference picture set may be deficient because it may be possible for these other techniques to determine to write a picture in dedicated chip memory, but this picture has a low probability of actually be used as a reference picture. With the example techniques described in this disclosure, by relying on the future reference picture lists, instead of or in addition to the reference picture set, and determining information (e.g., various metrics) from the future reference picture lists, there may be higher likelihood that the picture written to in the dedicated chip memory is accessed more often compared to other pictures.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110.

Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for determining whether to write a picture in dedicated chip memory or non-dedicated system memory. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for determining whether to write picture in dedicated chip memory or non-dedicated system memory. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB), G.723.1, G.726, G.728, G.729, G.729.1, GSM-FR, HE-AAC, iLBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, TrueAudio (TTA), TwinVQ, USAC, Vorbis (Ogg), WavPack, and Windows Media Aud.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that uses inter-prediction coding.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (Pus), and transform units (TUs). According to HEVC, a video coder (such as video encoder 200) partitions a coding tree unit (CTU) into Cus according to a quadtree structure. That is, the video coder partitions CTUs and Cus into four equal, non-overlapping squares, and each node of the quadtree has either zero or four child nodes. Nodes without child nodes may be referred to as "leaf nodes," and Cus of such leaf nodes may include one or more Pus and/or one or more TUs. The video coder may further partition Pus and TUs. For example, in HEVC, a residual quadtree (RQT) represents partitioning of TUs. In HEVC, Pus represent inter-prediction data, while TUs represent residual data. Cus that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between Cus, Pus, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to Cus.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or Cus) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, Cus need not necessarily have the same number of samples in the horizontal direction as in the vertical direction. For example, Cus may include N×M samples, where M is not necessarily equal to N.

Video encoder 200 encodes video data for Cus representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., Cus) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define Cus of the CTU. The syntax elements may further define prediction and residual information for blocks (e.g., Cus) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, video encoder 200 and video decoder 300 may determine whether to write a current picture in dedicated chip memory or non-dedicated system memory. Dedicated chip memory may be memory that video encoder 200 and video decoder 300 can access quickly with relatively low power compared to non-dedicated system memory. Examples of dedicated chip memory include on-chip cache memory of the integrated circuit (IC) chip that includes video encoder 200 or video decoder 300. The dedicated chip memory may be shared by components within the IC chip, but not by components external to the IC chip. Examples of non-dedicated system memory includes off-chip memory such as random access memory (RAM).

As described above, one of the video coding techniques is inter-prediction, in which video encoder 200 and video decoder 300 may access a reference picture (e.g., a previously coded picture) to encode or decode a current block of a current picture. That is, video encoder 200 and video decoder 300 may generate a prediction block, from samples of the reference picture, used for encoding or decoding. The amount of time and power needed to access the reference picture may be based on whether the reference picture is stored in the dedicated chip memory or the non-dedicated system memory, where less time and power are needed to access the reference picture form the dedicated chip memory.

In one or more examples, video encoder 200 and video decoder 300 may determine whether a current picture should be stored in the dedicated chip memory or the non-dedicated system memory. In some examples, video encoder 200 and video decoder 300 may determine whether the current picture should be stored in the dedicated chip memory or the non-dedicated system memory even before encoding or decoding the current picture. However, it may be possible to determine whether the current picture should be stored in the dedicated chip memory or the non-dedicated system memory after or during the encoding or decoding of the current picture.

Video encoder 200 and video decoder 300 may determine whether to write the current picture in the dedicated chip memory or the non-dedicated system memory based on information derived from future reference picture lists of future pictures. Future pictures refer to pictures that follow the current picture in coding order. A reference picture list includes candidate reference pictures which may be used as a reference picture for a current block being encoded or decoded. As described above, there may be two reference picture lists: list 0 and list 1, but the example techniques are not limited to list 0 and list 1. Each of list 0 and list 1 may include a plurality of entries (e.g., 5-16 entries) that each identifies a different reference picture. It is possible for one reference picture to be included in both list 0 and list 1.

Video encoder 200 may signal information to video decoder 300 for how to construct the reference picture list(s) for the current picture. However, for future pictures, video decoder 300 may not have information for how to construct the reference picture list(s).

In one or more examples, video decoder 300 may generate a plurality of future reference picture lists associated with a plurality of future pictures based on previously coded pictures. For example, in the video sequence being decoded, there may be a plurality of sets of pictures. The set of pictures is one example of a coding structure having a set of properties. For instance, the size of a plurality of sequential sets of pictures may be same. As another example, a first instantaneous decoder refresh (IDR) picture and a second IDR picture may define ends of the first set of pictures and the second set of pictures, and the first set of pictures may be the first half of pictures between the first IDR picture and the second IDR picture, and the second set of pictures may be the second half of the pictures between the first IDR picture and the second IDR picture. In some examples, each set of pictures may start with an IDR picture. In some examples, a picture in a set of pictures may not be inter-predicted with a reference picture in another set of pictures. The set of pictures may be an example of a group of pictures (GOP) structure, such as those in H.264 or AV1, but example techniques are not limited to GOP of H.264 or AV1.

In some examples, the structure profile of a first set of pictures may the same as the structure profile of a second set of pictures. For instance, there may be certain similarities between reference picture lists for pictures in the first set of pictures, and reference picture lists for pictures in the second set of pictures, where the second set of pictures sequentially follow the first set of pictures in coding order. The structure profile may refer information about which pictures are inter-predicted from which other pictures, a prediction mode of the pictures, a temporal layer identification of the pictures, etc.

For instance, assume that the second set of pictures includes the current picture and future pictures (e.g., pictures coded after the current picture), and the first set of pictures includes previous pictures (e.g., pictures previously coded). Because video decoder 300 already reconstructed the previous pictures for the first set of pictures, the reference picture lists of the first set of pictures are available to video decoder 300.

In some cases, the difference between a previous picture in the first set of pictures and a reference picture in an entry in a reference picture list for the previous picture in the first set of pictures may be the same as the difference between an associated picture in the second set of pictures and a reference picture in an entry in a reference picture list for the associated picture in the second set of pictures. An associated picture in the second set of pictures may be in the same coding order in the second set of pictures as a previous picture in the first set of pictures. For instance, the first picture in coding order in the first set of pictures is associated with the first picture in coding order in the second set of pictures. The second picture in coding order in the first set of pictures is associated with the second picture in coding order in the second set of pictures, and so forth.

For example, assume that a first entry in list 0 for the Nth picture, in the first set of pictures in coding order, identifies a picture that is N-$P_i$ in coding order in the first set of pictures. In this example, a first entry in list 0 for the Nth picture, in the second set of pictures in coding order, is likely to identify a picture that is N-$P_i$ in coding order in the second set of pictures.

In this way, video decoder 300 may determine reference picture lists for pictures in the second set of pictures even if pictures in the second set of pictures have yet to be decoded. For instance, the second set of pictures may include the current picture and future pictures. Video decoder 300 may determine the future reference picture list(s) for the future pictures in the second set of pictures based on associated previous pictures in the first set of pictures (e.g., based on previous pictures in the same relative coding order location in the first set of pictures as the respective future pictures in the second set of pictures).

Stated another way, video decoder 300 may generate, based on a first set of pictures coded prior to a second set of pictures, a plurality of future reference picture lists associated with the plurality of future pictures. The second set of pictures include a current picture and a plurality of future pictures, and the plurality of future pictures following the current picture in decoding order. As one example, video decoder 300 may determine respective previous pictures in the first set of pictures located in same relative locations in the first set of pictures (e.g., in coding order) that the plurality of the future pictures are located in the second set of pictures (e.g., in coding order). Video decoder 300 may determine respective reference picture lists for the respective previous pictures, and generate respective plurality of future reference picture lists for each of the plurality of future pictures based on the determined respective reference picture lists for the respective previous pictures.

The above examples describe examples of generating the plurality of future reference picture lists. However, the generation of the plurality of future reference picture lists should not be construed to require the generation of the entire future reference picture lists. For instance, a future reference picture list may include a plurality of entries. In some examples, video decoder 300 may generate a portion of the future reference picture list (e.g., first two entries of the future reference picture list for each of the future pictures). Accordingly, in this disclosure, description of generating the plurality of future reference picture lists includes examples where video decoder 300 generates the entire future reference picture list or a portion of the future reference picture list.

Video encoder 200 may be configured to generate the plurality of future reference picture lists using similar process. However, in some examples, because video encoder 200 determined which pictures belong in the reference picture lists, video encoder 200 may not need to rely on reference picture lists of previous pictures in the first set of pictures to determine reference picture lists of pictures in the second set of pictures.

That is, video encoder 200 and video decoder 300 may generate a plurality of future reference picture lists associated with a plurality of future pictures of a set of pictures. The set of pictures includes a current picture and the plurality of future pictures, and the plurality of future pictures follow the current picture in coding order. For video decoder 300, the set of pictures may be a second set of pictures. To generate the plurality of future reference picture lists, video decoder 300 may generate, based on a first set of pictures coded prior to the second set of pictures, the plurality of future reference picture lists associated with the plurality of future pictures.

From the perspective of the video decoder 300, the future reference picture lists may be a prediction of the actual future reference picture lists because it is possible that the actual future reference picture lists end up being different than the future preference picture lists that the video decoder determined. From the perspective of the video encoder 200, the future reference picture lists may be determined and known, and not necessarily a prediction. Accordingly, in one or more examples, the plurality of future reference picture lists may be predicted (e.g., for the video decoder 300) or determined (e.g., for the video encoder 200) future reference picture lists that identify pictures usable as reference pictures for the plurality of future pictures.

In accordance with one or more examples described in this disclosure, video encoder 200 and video decoder 300 may determine, based on information derived from the plurality of future reference picture lists associated with the plurality of future pictures, whether to write the current picture in a dedicated chip memory or a non-dedicated chip memory. As one example, video encoder 200 and video decoder 300 may select one of a dedicated chip memory and a non-dedicated system memory to which the current picture is written based on information derived from the plurality of future reference picture lists. The current picture refers to the picture that is about to be or is being encoded or decoded. In some examples, video encoder 200 and video decoder 300 may determine whether to write the current picture in a dedicated chip memory or a non-dedicated chip memory prior to encoding or decoding the current picture, during encoding or decoding the current picture, or after encoding or decoding the current picture.

In one or more examples, the future pictures, whose future reference picture lists, video encoder 200 and video decoder 300 evaluate may be a subset of all of the pictures in the second set of pictures. That is, the second set of pictures may include the current picture, the plurality of future pictures, and one or more additional pictures. In some examples, video encoder 200 and video decoder 300 may be configured with a definition of a search range. The search range defines the number of future pictures, whose future reference picture lists, video encoder 200 and video decoder 300 evaluate to derive information used for determining whether to write the current picture in a dedicated chip memory or a non-dedicated chip memory. For instance, the plurality of future pictures may form the pictures of the search range, and the one or more additional pictures may be pictures in addition to the future pictures that form the search range, but are within the set of pictures.

In some examples, the search range is five future pictures. In some examples, the search range may be based on the number of pictures in a set of pictures. For instance, the search range may be equal to $\log_2$(number of pictures in set of pictures). If $\log_2$(number of pictures in set of pictures)+1<2, then the search range may be set equal to two.

Video encoder 200 and video decoder 300 may derive example metrics from the plurality of future reference picture lists associated with the plurality of future pictures. For instance, as described, the plurality of future reference picture lists includes a plurality of entries referenced by respective index values (e.g., index 0 for list 0 is for the first entry in list 0, index 1 for list 0 is the for the second entry in list 0, and so forth). Video encoder 200 and video decoder 300 may determine which reference picture is identified at an index of a future reference picture list for each of a plurality of future pictures.

As an example, assume there are five future pictures in a search range: future pictures 1-5. Video encoder 200 and video decoder 300 may determine which reference picture is identified in future reference picture list 0 for future picture 1 at index 0, which reference picture is identified in future reference picture list 0 for future picture 2 at index 0, and so forth. Video encoder 200 and video decoder 300 may determine which reference picture is identified in future reference picture list 1 for future picture 1 at index 0, which reference picture is identified in future reference picture list 1 for future picture 2 at index 0, and so forth. Video encoder 200 may determine which reference picture is identified in future reference picture list 0 for future picture 1 at index 1, which reference picture is identified in future reference picture list 0 for future picture 2 at index 1, and so forth. Video encoder 200 may determine which reference picture is identified in future reference picture list 1 for future picture 1 at index 1, which reference picture is identified in future reference picture list 1 for future picture 2 at index 1, and so forth.

Video encoder 200 and video decoder 300 may repeat these operations for all entries of future reference picture lists for future pictures 1-5, or a subset of entries of future reference picture lists for future pictures 1-5. In some examples, video encoder 200 and video decoder 300 may determine which reference picture is identified at one or more indices of one of the future reference picture lists, but not the others.

The size of the search range, the number of future reference picture lists that are evaluated, and the number of entries in the future reference picture lists that are evaluated may be based on a balance of complexity and accuracy of determining whether to write the current picture in dedicated chip memory or non-dedicated system memory. In some cases, determining which reference picture is identified at a larger number of entries in the future reference picture lists may, but not necessarily, provide better information for determining whether to write a current picture in dedicated chip memory or non-dedicated system memory as compared to identifying fewer number of entries in the future reference picture lists. However, determining which reference picture is identified at a larger number of entries in the future reference picture lists may require additional processing time and memory requirements.

Similarly, increasing the size of the search range (e.g., number of future pictures whose future reference picture lists are evaluated) or increasing the number of future reference picture lists may, but not necessarily, result in better information for determining whether to write a current picture in dedicated chip memory or non-dedicated system memory as compared to identifying fewer future reference picture lists or having a smaller search range. However, increasing the size of the search range or evaluating two or more future reference picture lists may require additional processing time and memory, as compared to smaller search range or evaluating fewer future reference picture lists.

Video encoder 200 and video decoder 300 may determine one or more metrics based on the determination of which reference picture is identified at an index of a future reference picture list for each of a plurality of future pictures. One example of the metrics is referred to as future reference count value. The future reference count value may be indicative of a number of times a particular reference picture is identified at certain indices, including the entirety, in the future reference picture lists. As an example, assume that index 0 of future reference picture list 0 for future pictures 1, 2, and 5 identify Reference Picture X, and assume that index 0 for future reference picture list 0 for future pictures 3 and 4 identify Reference Picture Y. In this example, the future reference count value for Reference Picture X is three, and the future reference count value for Reference Picture Y is two.

In the above example, video encoder 200 and video decoder 300 considered index 0 of future reference picture list 0 for future pictures 1-5 to determine the future reference count values. In some examples, video encoder 200 and video decoder 300 may also consider index 0 of future reference picture list 1 for future pictures 1-5.

Video encoder 200 and video decoder 300 may determine whether the current picture is to be written in dedicated chip memory or non-dedicated chip memory based on the future reference count values. For instance, assume that Reference Picture X in above example is the current picture. Again, because Reference Picture X is a reference picture identified in a future reference picture list, it is possible for the current picture to be Reference Picture X because the current picture can be a reference picture for a future picture. Also, assume that Reference Picture Y is the reference picture that is currently stored in dedicated chip memory.

In this example, because the future reference count value for the current picture (i.e., Reference Picture X) is greater than the future reference count value for Reference Picture Y, there is a higher likelihood that the current picture will be accessed more often than Reference Picture Y. Accordingly, video encoder 200 and video decoder 300 may write the current picture in the dedicated chip memory, and replace Reference Picture Y in the dedicated chip memory. For instance, video encoder 200 and video decoder 300 may write Reference Picture Y to the non-dedicated system memory.

In the above example, video encoder 200 and video decoder 300 utilized the future reference count value (i.e., a number of times a reference picture is identified at an index in a future reference picture list) to determine whether to write the current picture in dedicated chip memory or non-dedicated system memory. In some examples, video encoder 200 and video decoder 300 may use the future reference count values to further refine the determination of whether to write the current picture in dedicated chip memory or non-dedicated system memory.

As one example, another metric that video encoder 200 and video decoder 300 may derive from the plurality of future reference picture lists associated with the plurality of future pictures is referred to reference benefit value, where the reference benefit value is derived from the future reference count value. For instance, video encoder 200 and video decoder 300 may account for in which entry a reference picture is identified in the future reference picture lists.

Reference pictures identified in first entry (e.g., index 0) of list 0 or list 1 tend to be accessed more than reference pictures identified in other entries of list 0 or list 1. As one example, for illustration purposes only, the reference picture for inter-prediction encoding or decoding a current block in a current picture is identified in index 0 of list 0 or list 1 over 90% of the time. The reference picture for inter-prediction encoding or decoding a current block in a current picture is identified in index 1 of list 0 or list 1 approximately 5-9% of the time.

Video encoder 200 and video decoder 300 may determine a reference benefit value for the current picture based on the future reference count value of the current picture weighted based on the entry at which the current picture is identified in the future reference picture lists. For example, video encoder 200 and video decoder 300 may determine a first reference count value of the current picture based on a number of times the current picture is identified in index 0 of each of the future reference picture lists associated with the future pictures (e.g., within the search range). Video encoder 200 and video decoder 300 may scale the first reference count value by a first weighting factor to generate a first scaled value. Video encoder 200 and video decoder 300 may determine a second reference count value of the current picture based on a number of times the current picture is identified in index 1 of each of the future reference picture lists associated with the future pictures (e.g., within the search range). Video encoder 200 and video decoder 300 may scale the second reference count value by a second weighting factor to generate a second scaled value.

Video encoder 200 and video decoder 300 may determine a reference benefit value for the current picture based on the first scaled value and the second scaled value. For example, video encoder 200 and video decoder 300 may add the first scaled value and the second scaled value together to determine the reference benefit value for the current picture.

Video encoder 200 and video decoder 300 may perform similar operations to determine the reference benefit value for the cached picture (i.e., the picture currently stored in the dedicated chip memory). If the reference benefit value for the current picture is greater than the reference benefit value for the cached picture, video encoder 200 and video decoder 300 may write the current picture in the dedicated chip memory. Otherwise, video encoder 200 and video decoder 300 may write the current picture in the non-dedicated system memory.

In this way, video encoder 200 and video decoder 300 may determine, based on information derived from the plurality of future reference picture lists associated with the plurality of future pictures, whether to write the current picture in a dedicated chip memory or a non-dedicated system memory, and write the current picture in the dedicated chip memory or the non-dedicated system memory based on the determination of whether to write the current picture in the dedicated chip memory or the non-dedicated system memory. For example, video encoder 200 and video decoder 300 may derive the information based on a number of times the current picture is identified among the plurality of future reference picture lists (e.g., in index 0 or index 1 of future reference picture lists 0 and 1). Video encoder 200 and video decoder 300 may also determine a number of times the cached picture is identified among the plurality of future reference picture lists (e.g., in index 0 or index 1 of future reference picture lists 0 and 1). Video encoder 200 and video decoder 300 may determine whether to write the current picture in the dedicated chip memory or the non-dedicated system memory based on whether the current picture or the cached picture are identified more in the plurality of future reference picture lists.

As further refinement, video encoder 200 and video decoder 300 may determine various metric in addition to the metric referred to as future reference count value. For example, the information derived from the future reference picture lists may be a first metric derived from a number of times the current picture is identified among the plurality of future reference picture lists associated with the plurality of future pictures (e.g., the reference benefit value for the current picture based on the future reference count value of the current picture). Video encoder 200 and video decoder 300 may derive a second metric associated with a cached picture stored in the dedicated chip memory based on the plurality of future reference picture lists associated with the plurality of future pictures (e.g., the reference benefit value for the current picture based on the future reference count value of the current picture). Video encoder 200 and video decoder 300 may compare the first metric to the second metric, and determine whether to write the current picture in the dedicated chip memory or the non-dedicated system memory based on the comparison.

Figure 2:
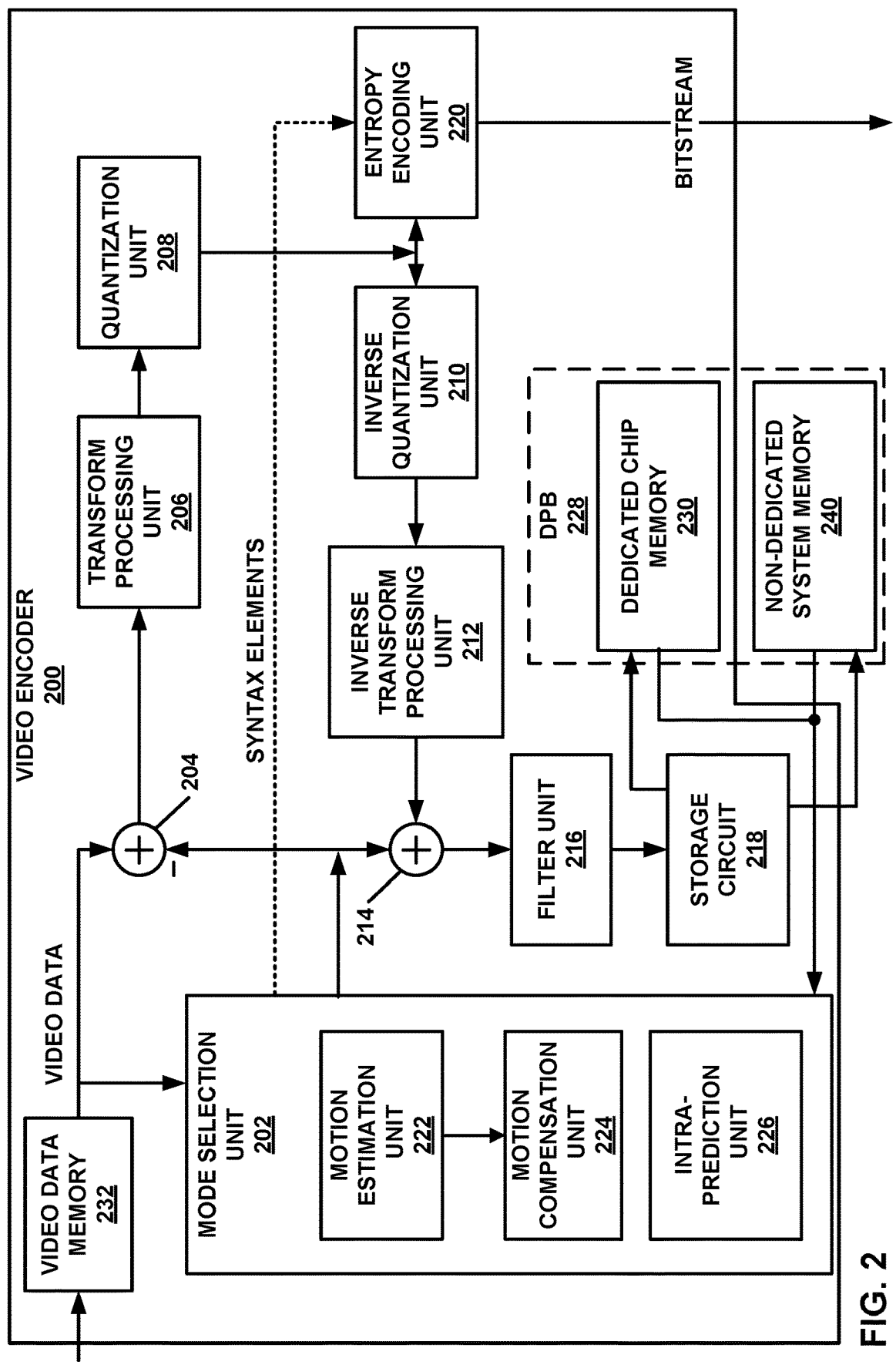
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 2, video encoder 200 includes video data memory 232, mode selection unit 202, residual generation unit 204, transform processing unit 206, quantization unit 208, inverse quantization unit 210, inverse transform processing unit 212, reconstruction unit 214, filter unit 216, storage circuit 218, decoded picture buffer (DPB) 228, and entropy encoding unit 220. Any or all of video data memory 232, mode selection unit 202, residual generation unit 204, transform processing unit 206, quantization unit 208, inverse quantization unit 210, inverse transform processing unit 212, reconstruction unit 214, filter unit 216, storage circuit 218, DPB 228, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

In the example of FIG. 2, DPB 228 includes dedicated chip memory 230 and non-dedicated system memory 240. In some examples, dedicated chip memory 230, such as cache memory, may be internal to the integrated circuit (IC) chip that includes video encoder 200. Non-dedicated system memory 240 may be external to the IC chip, and may be shared by components other than those of the IC chip that includes video encoder 200. As described in more detail, DPB 228 stores pictures that can be used as reference pictures. In accordance with one or more example, storage circuit 218 may determine whether to write a current picture being encoded to dedicated chip memory 230 or non-dedicated system memory 240 based on future reference picture lists of future pictures. Storage circuit 218 may determine whether to write a current picture being encoded to dedicated chip memory 230 or non-dedicated system memory 240 prior to encoding the current picture, during the encoding of the current picture, or after encoding the current picture.

Video data memory 232 may store video data to be encoded by the components of video encoder 200. Video encoder 200 may receive the video data stored in video data memory 232 from, for example, video source 104 (FIG. 1). DPB 228 may act as a reference picture memory that stores reference video data for use in prediction of subsequent video data by video encoder 200. Video data memory 232 and non-dedicated system memory 240 of DPB 228 may be formed by any of a variety of memory devices, such as dynamic random access memory (DRAM), including synchronous DRAM (SDRAM), magnetoresistive RAM (MRAM), resistive RAM (RRAM), or other types of memory devices. Dedicated chip memory 230 may be formed as cache memory (e.g., L1 or L2 cache, or last-level cache). In various examples, DPB 228, at least partially, may be on-chip with other components of video encoder 200, as illustrated, or, at least partially, off-chip relative to those components, as illustrated.

In this disclosure, reference to video data memory 232 should not be interpreted as being limited to memory internal to video encoder 200, unless specifically described as such, or memory external to video encoder 200, unless specifically described as such. Rather, reference to video data memory 232 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 232 is configured to store received video data. Video encoder 200 may retrieve a picture of the video data from video data memory 232 and provide the video data to residual generation unit 204 and mode selection unit 202. Video data in video data memory 232 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into Cus, prediction modes for the Cus, transform types for residual data of the Cus, quantization parameters for residual data of the Cus, and so on. Mode selection unit 202 may ultimately select the combination of encoding parameters having rate-distortion values that are better than the other tested combinations.

Video encoder 200 may partition a picture retrieved from video data memory 232 into a series of CTUs, and encapsulate one or more CTUs within a slice. Mode selection unit 202 may partition a CTU of the picture in accordance with a tree structure, such as the MTT structure, QTBT structure. Superblock structure, or the quad-tree structure described above. As described above, video encoder 200 may form one or more Cus from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 228). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 232 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions Cus into Pus, each PU may be associated with a luma prediction unit and corresponding chroma prediction units. Video encoder 200 and video decoder 300 may support Pus having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into Pus, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Video encoder 200 includes a reconstruction loop in which an encoded current picture is reconstructed and stored in DPB 228. This way, the current picture is available as a reference picture for future pictures. The reconstruction loop includes inverse quantization unit 210, inverse transform processing unit 212, reconstruction unit 214, and optionally filter unit 216.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of Cus. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of Cus. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 228. For instance, in examples where operations of filter unit 216 are not performed, reconstruction unit 214 may store reconstructed blocks to DPB 228. In examples where operations of filter unit 216 are performed, filter unit 216 may store the filtered reconstructed blocks to DPB 228. Motion estimation unit 222 and motion compensation unit 224 may retrieve a reference picture from DPB 228, formed from the reconstructed (and potentially filtered) blocks, to inter-predict blocks of subsequently encoded pictures. In addition, intra-prediction unit 226 may use reconstructed blocks in DPB 228 of a current picture to intra-predict other blocks in the current picture.

In one or more examples described in this disclosure, storage circuit 218 may determine whether reconstructed blocks of the current picture are to be stored in dedicated chip memory 230 or non-dedicated system memory 240. For instance, mode selection unit 202 may be configured to generate reference picture lists (e.g., list 0 and list 1) from which mode selection unit 202 may determine a reference picture. In some examples, mode selection unit 202 may determine reference picture lists for the current picture, as well as future reference picture lists associated with future pictures that follow the current picture in encoding order. The current picture and the future pictures, as well as possibly additional pictures may form a set of pictures. For example, the future pictures may form a search range, but there may be more pictures in the set of pictures (e.g., additional pictures in addition to the current picture and the pictures that form the search range in the set of pictures).

Storage circuit 218 may determine, based on information derived from the plurality of future reference picture lists associated with the plurality of future pictures, whether to write the current picture in dedicated chip memory 230 or non-dedicated system memory 240. That is, storage circuit 218 may select one of dedicated chip memory 230 and non-dedicated system memory 240 to which the current picture is written based on information derived from the plurality of future reference picture lists. For example, storage circuit 218 may derive the information based on a number of times the current picture is identified among the plurality of future reference picture lists. As an example, storage circuit 218 may determine a number of times the current picture is identified in the first entry (e.g., index 0) of future reference picture list 0 of each of the plurality of future pictures, a number of times the current picture is identified in the first entry (e.g., index 0) of future reference picture list 1 of each of the plurality of future pictures, a number of times the current picture is identified in the first entry (e.g., index 0) and the second entry (e.g., index 1) of future reference picture list 0 of each of the plurality of future pictures, a number of times the current picture is identified in the first entry (e.g., index 0) and the second entry (e.g., index 1) of future reference picture list 1 of each of the plurality of future pictures, or any combination thereof. Also, the example techniques should not be considered limited to index 0 and index 1, and other entries are possible.

Similarly, storage circuit 218 may determine a number of times a cached picture (e.g., stored in dedicated chip memory 230 at the time the current picture is being encoded) is identified among the plurality of future reference picture lists. Storage circuit 218 may evaluate the first entry and/or second entry of future reference picture lists 0 and/or 1, as described above, to determine the number of times the cached picture is identified among the plurality of future reference picture lists. Storage circuit 218 may determine whether to write the current picture in dedicated chip memory 230 based on the number of times the current picture is identified among the plurality of future reference picture lists and the number of times the cached picture is identified among the plurality of future reference picture lists.

As another example, storage circuit 218 may derive a first metric from a number of times the current picture is identified among the plurality of future reference picture lists associated with the plurality of future pictures, and derive a second metric associated with a cached picture stored in the dedicated chip memory based on the plurality of future reference picture lists associated with the plurality of future pictures. Storage circuit 218 may compare the first metric to the second metric, and determine whether to write the current picture in the dedicated chip memory 230 or the non-dedicated system memory 240 based on the comparison. If the first metric is less than the second metric, storage circuit 218 may write the blocks of the current picture to the non-dedicated system memory 240. If the first metric is greater than the second metric, storage circuit 218 may write the blocks of the current picture to the dedicated chip memory 230.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 3:
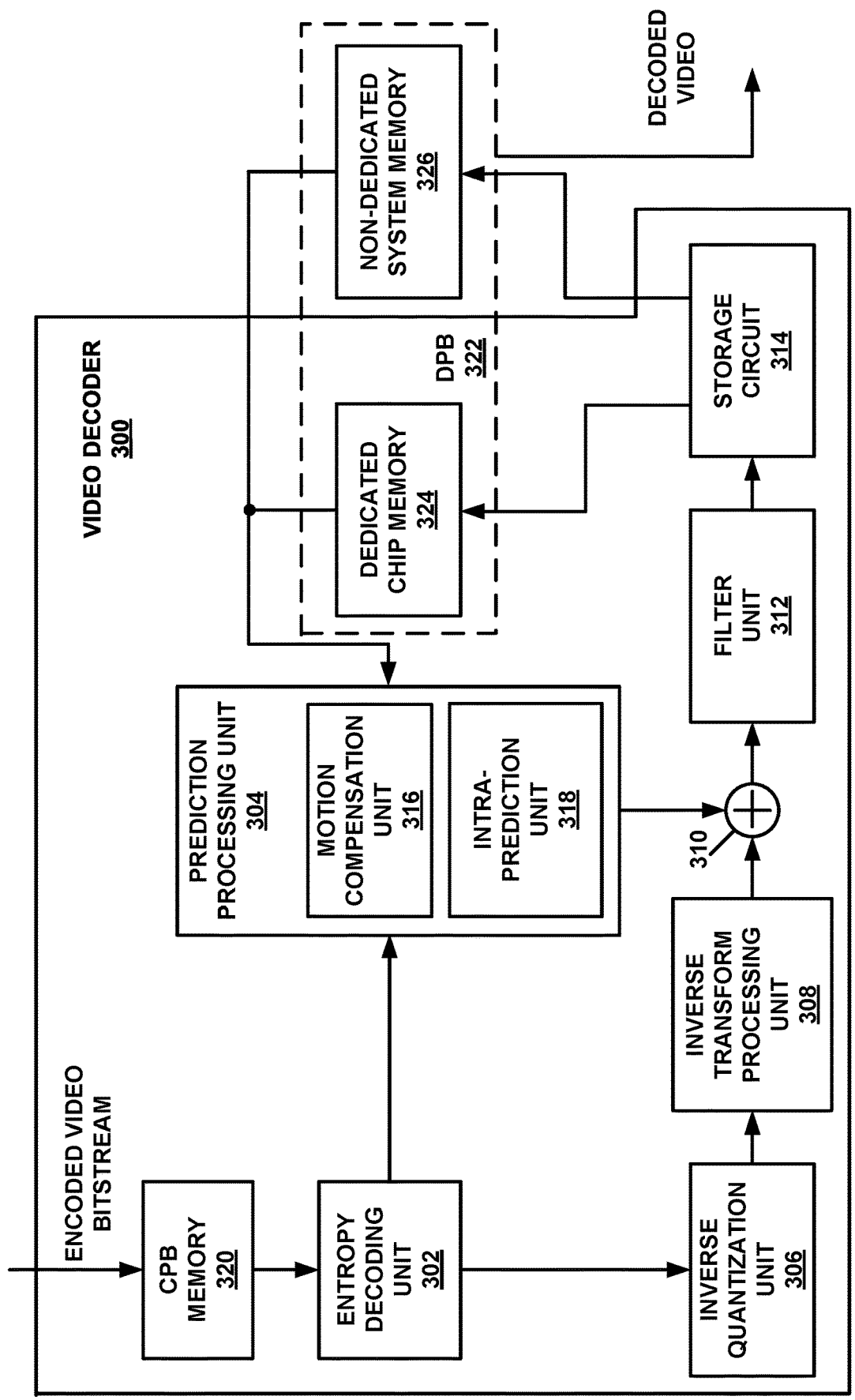
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, storage circuit 314, and DPB 322. Any or all of CPB memory 320, entropy decoding unit 302, prediction processing unit 304, inverse quantization unit 306, inverse transform processing unit 308, reconstruction unit 310, filter unit 312, storage circuit 314, and DPB 322 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

In the example of FIG. 3, DPB 322 includes dedicated chip memory 324 and non-dedicated system memory 326. In some examples, dedicated chip memory 324, such as cache memory, may be internal to the integrated circuit (IC) chip that includes video decoder 300. Non-dedicated system memory 326 may be external to the IC chip, and may be shared by components other than those of the IC chip that includes video decoder 300. As described in more detail, DPB 322 stores pictures that can be used as reference pictures. In accordance with one or more example, storage circuit 314 may determine whether to write a current picture being decoded to dedicated chip memory 324 or non-dedicated system memory 326 based on future reference picture lists of future pictures. Storage circuit 314 may determine whether to write a current picture being decoded to dedicated chip memory 324 or non-dedicated system memory 326 prior to decoding the current picture, during the decoding of the current picture, or after decoding the current picture.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 322 generally stores decoded pictures, which video decoder 300 may output and/or use as reference video data when decoding subsequent data or pictures of the encoded video bitstream. CPB memory 320 and non-dedicated system memory 326 of DPB 322 may be formed by any of a variety of memory devices, such as DRAM, including SDRAM, MRAM, RRAM, or other types of memory devices. Dedicated chip memory 324 may be formed as cache memory (e.g., L1 or L2 cache, or last-level cache). In various examples, DPB 322, at least partially, may be on-chip with other components of video decoder 300, as illustrated, or, at least partially, off-chip relative to those components, as illustrated.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 322 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 322.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 322. For instance, in examples where operations of filter unit 312 are not performed, reconstruction unit 310 may store reconstructed blocks to DPB 322. In examples where operations of filter unit 312 are performed, filter unit 312 may store the filtered reconstructed blocks to DPB 322. As discussed above, DPB 322 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 322 for subsequent presentation on a display device, such as display device 118 of FIG. 1.

In one or more examples described in this disclosure, storage circuit 314 may determine whether reconstructed blocks of the current picture are to be stored in dedicated chip memory 324 or non-dedicated system memory 326. In one or more examples, to determine whether blocks of the current picture are to be stored in dedicated chip memory 324 or non-dedicated system memory 326, storage circuit 314 may generate, based on a first set of pictures coded prior to a second set of pictures, a plurality of future reference picture lists associated with the plurality of future pictures. The second set of pictures include a current picture and the plurality of future pictures, and the plurality of future pictures follow the current picture in decoding order.

As one example, to generate the plurality of future reference picture lists, storage circuit 314 may determine respective previous pictures in the first set of pictures located in a same relative location in the first set of pictures that the plurality of future pictures are located in the second set of pictures. Storage circuit 314 may determine respective reference picture lists for the respective previous pictures, and generate respective plurality of future reference picture lists for each of the plurality of future pictures based on the determined respective reference picture lists for the respective previous pictures. An example way to generate the plurality of future reference picture lists is described with respect to FIGS. 4A and 4B.

Storage circuit 314 may determine, based on information derived from the plurality of future reference picture lists associated with the plurality of future pictures, whether to write the current picture in dedicated chip memory 324 or non-dedicated system memory 326. For example, storage circuit 314 may select one of a dedicated chip memory 324 and a non-dedicated system memory 326 to which the current picture is written based on information derived from the plurality of future reference picture lists. For example, storage circuit 314 may derive the information based on a number of times the current picture is identified among the plurality of future reference picture lists. As an example, storage circuit 314 may determine a number of times the current picture is identified in the first entry (e.g., index 0) of future reference picture list 0 of each of the plurality of future pictures, a number of times the current picture is identified in the first entry (e.g., index 0) of future reference picture list 1 of each of the plurality of future picture, a number of times the current picture is identified in the first entry (e.g., index 0) and the second entry (e.g., index 1) of future reference picture list 0 of each of the plurality of future pictures, a number of times the current picture is identified in the first entry (e.g., index 0) and the second entry (e.g., index 1) of future reference picture list 1 of each of the plurality of future pictures, or any combination thereof. Also, the example techniques should not be considered limited to index 0 and index 1, and other entries are possible.

Similarly, storage circuit 314 may determine a number of times a cached picture (e.g., stored in dedicated chip memory 324 at the time the current picture is being decoded) is identified among the plurality of future reference picture lists. Storage circuit 314 may evaluate the first entry and/or second entry of future reference picture lists 0 and/or 1, as described above, to determine the number of times the cached picture is identified among the plurality of future reference picture lists. Storage circuit 314 may determine whether to write the current picture in dedicated chip memory 324 based on the number of times the current picture is identified among the plurality of future reference picture lists and the number of times the cached picture is identified among the plurality of future reference picture lists.

As another example, storage circuit 314 may derive a first metric from a number of times the current picture is identified among the plurality of future reference picture lists associated with the plurality of future pictures, and derive a second metric associated with a cached picture stored in the dedicated chip memory based on the plurality of future reference picture lists associated with the plurality of future pictures. Storage circuit 314 may compare the first metric to the second metric, and determine whether to write the current picture in the dedicated chip memory 324 or the non-dedicated system memory 326 based on the comparison. If the first metric is less than the second metric, storage circuit 314 may write the blocks of the current picture to the non-dedicated system memory 326. If the first metric is greater than the second metric, storage circuit 314 may write the blocks of the current picture to the dedicated chip memory 324.

Figure 4A:
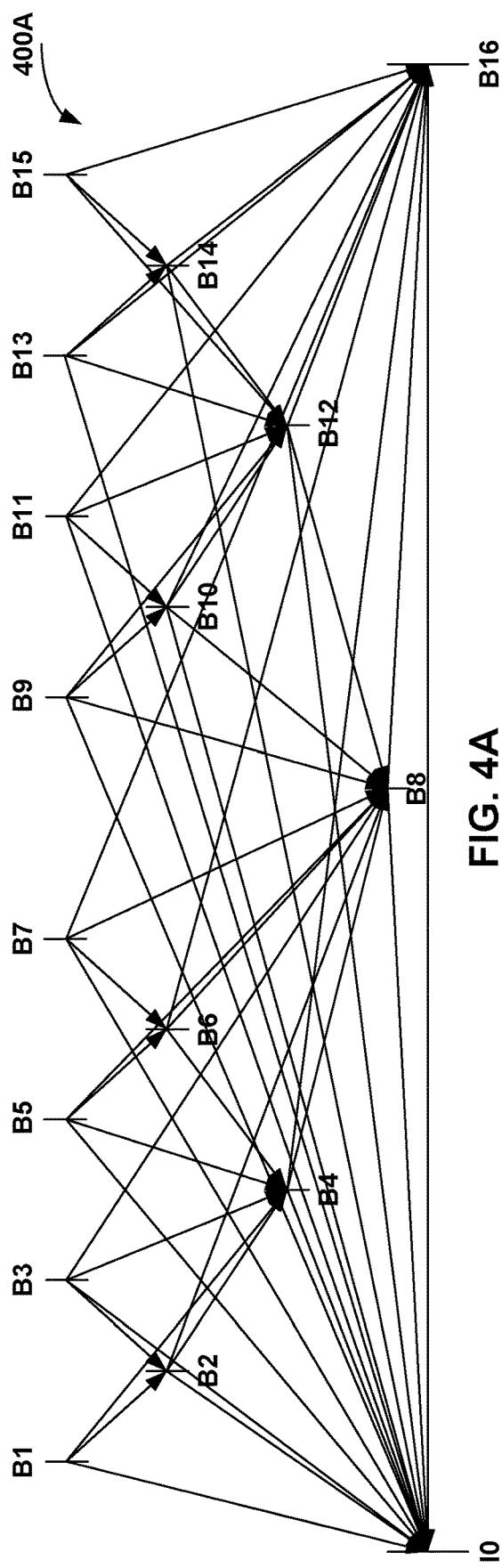
FIGS. 4A and 4B are conceptual diagrams illustrating dependency of pictures for inter-prediction.
Figure 4B:
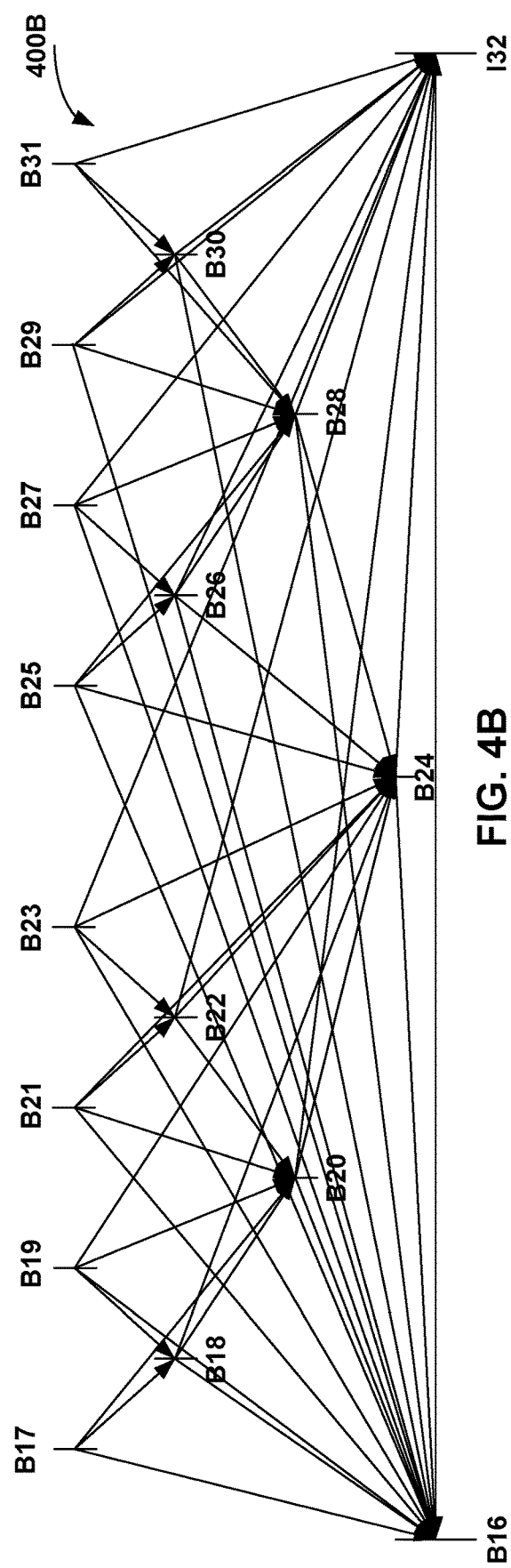

FIGS. 4A and 4B are conceptual diagrams illustrating dependency of pictures for inter-prediction. For instance, FIG. 4A illustrates first set of pictures 400A, and FIG. 4B illustrates second set of pictures 400B. In the example of FIGS. 4A and 4B, the first set of pictures 400A may be previously coded pictures (e.g., include previous pictures), and include pictures I0 to B16. The second set of pictures may include a current picture and one or more future pictures, and include pictures B17 to I32. I0 and I32 may be IDR pictures, and in this example, first set of pictures 400A may include the first half of pictures between I0 and I32, and second set of pictures 400B may include the second half of pictures between I0 and I32.

The arrows in FIGS. 4A and 4B illustrate which pictures are reference pictures for a given picture. For example, picture B1 has an arrow towards picture I0 and an arrow towards picture B2. Therefore, pictures I0 and B2 are reference pictures for picture B1.

In FIGS. 4A and 4B, the picture names B1, B2, etc. do not refer to the coding order. The coding order refers to the order in which video encoder 200 or video decoder 300 encode or decode the pictures. For purposes of illustration, in the example of FIGS. 4A, the coding order may be as follows: B16, B8, B4, B2, B1, B3, B6, B5, B7, B12, B10, B9, B11, B14, B13, and B15. Accordingly, picture B6 is coded (e.g., encoded or decoded) before B5. I0 of first set of pictures 400 is an intra-picture, and is not predicted with reference pictures.

The dependency in the second set of pictures 400B may be a predicted dependency based on first set of pictures 400A. That is, it may be assumed that the second set of pictures 400B includes pictures that are coded in the same order as the first set of pictures 400A, and the reference picture lists for pictures in the second set of pictures 400B may be correlated with the reference picture lists for pictures in the first set of pictures 400A.

This assumption of the correlations in coding order of pictures and reference picture lists in the first set of pictures 400A and the second set of pictures 400B may generally hold true over an entire video sequence. For instance, there may be epochs in the video sequence, where an epoch includes multiple sets of pictures, where each set of pictures is correlated with the previous set of pictures in coding order of pictures and reference pictures. At some point, the correlation may no longer hold true. However, within the epoch, which may include hundreds of sets of pictures, the assumed correlation may hold true. The example techniques may exploit this correlation for predicting future reference picture lists, from which a determination is made whether to store the current picture in dedicated chip memory 230 or 324 or non-dedicated system memory 240 or 326.

Accordingly, the coding order in FIG. 4B may be assumed as follows: B16, B24, B20, B18, B17, B19, B22, B21, B23, B28, B26, B25, B27, B30, B29, and B31. I32 of second set of pictures 400B is an intra-picture, and is not predicted with reference pictures. In the example of FIGS. 4A and 4B, picture B8 in the first set of pictures 400A is located in the same relative location in the first set of pictures 400A, in coding order (e.g., second picture in coding order in first set of pictures 400A), that picture B24 in the second set of pictures 400B is located in the second set of pictures 400B (e.g., second picture in coding order in second set of pictures 400B). Picture B4 in the first set of pictures 400A is located in the same relative location in the first set of pictures 400A, in coding order (e.g., third picture in coding order in the first set of pictures 400A), that picture B20 in the second set of pictures 400B is located in the second set of pictures 400B (e.g., third picture in coding order in the second set of pictures 400B), and so forth.

As described, there may be correlation between the reference picture lists of a picture in the first set of pictures 400A and the reference picture lists of a picture in the second set of pictures 400B. For instance, assume that index 0 of list 0 of picture B5 identifies picture B6. In this example, the coding order distance (e.g., the difference in the coding order values) is one because B5 follows B6 in coding order. The coding order value may be indicative coding order of the pictures in ascending order. For instance, picture B6 is the seventh picture in coding order, and picture B5 is the eighth picture in coding order in the first set of pictures 400A. Eight minus seven is one, and therefore, the coding order distance between picture B5 and B6 is one.

Picture B21 is at the same coding order location in the second set of pictures 400B as picture B5 is in the first set of pictures 400A. Picture B22 is at the same coding order location in the second set of pictures 400B as picture B6 is in the first set of pictures 400A.

In one or more examples, storage circuit 314 may determine that for index 0 of list 0 of picture B21, the coding order distance of the picture to be identified at index 0 is one because the coding order distance between the picture identified at index 0 of list 0 for picture B5 is one, and B5 and B21 are in the same relative coding order location in first set of pictures 400A and second set of pictures 400B. In this example, storage circuit 314 may determine that picture B22 should be identified in index 0 of list 0 of picture B21.

For instance, assume that picture B18 is the current picture being decoded. Accordingly, video decoder 300 may not have received information indicating which pictures belong in the reference picture list for picture B21. However, because video decoder 300 had previously constructed the reference picture lists for picture B5, and picture B5 is in the same coding order location in first set of pictures 400A that picture B21 is in the second set of pictures 400B, storage circuit 314 may be able to predict that picture B22 is in index 0 of list 0 for picture B21 because picture B6 is in index 0 of list 0 for picture B5.

Stated another way, to generate future reference picture lists for picture B21 in second set of pictures 400B based on first set of pictures 400A coded prior to second set of pictures 400B, storage circuit 314 may determine the coding order location of picture B21 in the second set of pictures 400B (e.g., eighth picture in coding order). Storage circuit 314 may determine a previous picture in first set of pictures 400A in the same coding order location as picture B21 is in the second set of pictures 400B. For instance, picture B5 (e.g., the previous picture) is the eighth picture in coding order in first set of pictures 400A, and is in the same coding order location as picture B21 in the second set of pictures 400B.

Storage circuit 314 may determine the coding order differences between each of the entries in list 0 and list 1 for previous picture B5. For instance, the coding order difference of the picture identified in index 0 of list 0 of previous picture B5 (e.g., picture B6) is one. Storage circuit 314 may use the coding order differences to determine the entries in list 0 and list 1 for picture B21. For instance, the coding order difference of the picture identified in index 0 of list 0 of picture B21 should also be one. In this example, picture B22 has a coding order difference of one relative to picture B21. Therefore, storage circuit 314 may determine that picture B22 is to be identified in index 0 of list 0 for picture B21.

In this way, storage circuit 314 may be configured to generate a plurality of future reference picture lists. For instance, assume that picture B18 is the current picture. Storage circuit 314 may perform the above example techniques to generate a future reference picture list 0 and/or list 1 for picture B17 based on list 0 and/or list 1 of previous picture B1 because picture B17 and picture B1 are in the same coding order location in respective second set of pictures 400B and first set of pictures 400A. Similarly, storage circuit 314 perform the above example techniques to generate a future reference picture list 0 and/or list 1 for picture B19 based on list 0 and/or list 1 of previous picture B3 because picture B19 and picture B3 are in the same coding order location in respective second set of pictures 400B and first set of pictures 400A, and so forth.

It may not be necessary for storage circuit 314 to generate the entirety of future reference picture list 0 and list 1 for future pictures of second set of pictures 400B. Rather, storage circuit 314 may generate a portion of future reference picture list 0 and list 1 (e.g., the first two entries for list 0 and list 1) for future pictures of second set of pictures 400B). Also, it may not be necessary for storage circuit 314 to generate both future reference picture list 0 and list 1 for future pictures of second set of pictures 400B, and may generate future reference picture list 0 or list 1 for future pictures of second set of pictures 400B.

As described above, the number of entries of future reference picture list 0 or list 1, and whether storage circuit 314 determines entries for both future reference picture list 0 and list 1 may be a balance of complexity. For instance, the more entries of future reference picture list 0 and/or list 1 that storage circuit 314 determines may, but not necessarily, result in a more accurate determination of whether to store a current picture in dedicated chip memory 324 or non-dedicated system memory 326, as compared to determining fewer entries. However, the complexity and storage requirements for determining more entries of future reference picture list 0 and/or list 1 may be greater than determining fewer entries of future reference picture list 0 and/or list 1.

Accordingly, in one or more examples, to generate the plurality of future reference picture lists, storage circuit 314 may be configured to determine respective previous pictures in the first set of pictures 400A located in a same relative coding order location in the first set of pictures 400A that the plurality of the future pictures are located in the second set of pictures 400B. For example, pictures B5 and B21 are in the same relative coding order locations, B6 and B22 are in the same relative coding order locations, and so forth, in first set of pictures 400A and second set of pictures 400B, respectively.

Storage circuit 314 may determine respective reference picture lists for the respective previous pictures. For instance, storage circuit 314 may determine the reference picture list 0 and list 1 for picture B5 (e.g., where index 0 of list 0 of picture B5 identified picture B6). Storage circuit 314 may generate respective plurality of future reference picture lists for each of the plurality of future pictures based on the determined respective reference picture lists for the respective previous pictures. For example, for picture B21, storage circuit 314 may determine picture B22 should be in index 0 of list 0 of picture B21. This is because the coding order difference is one between picture B5 and the picture identified in index 0 of list 0 of picture B5, and the coding order difference is one between picture B21 and picture B22.

Figure 5:
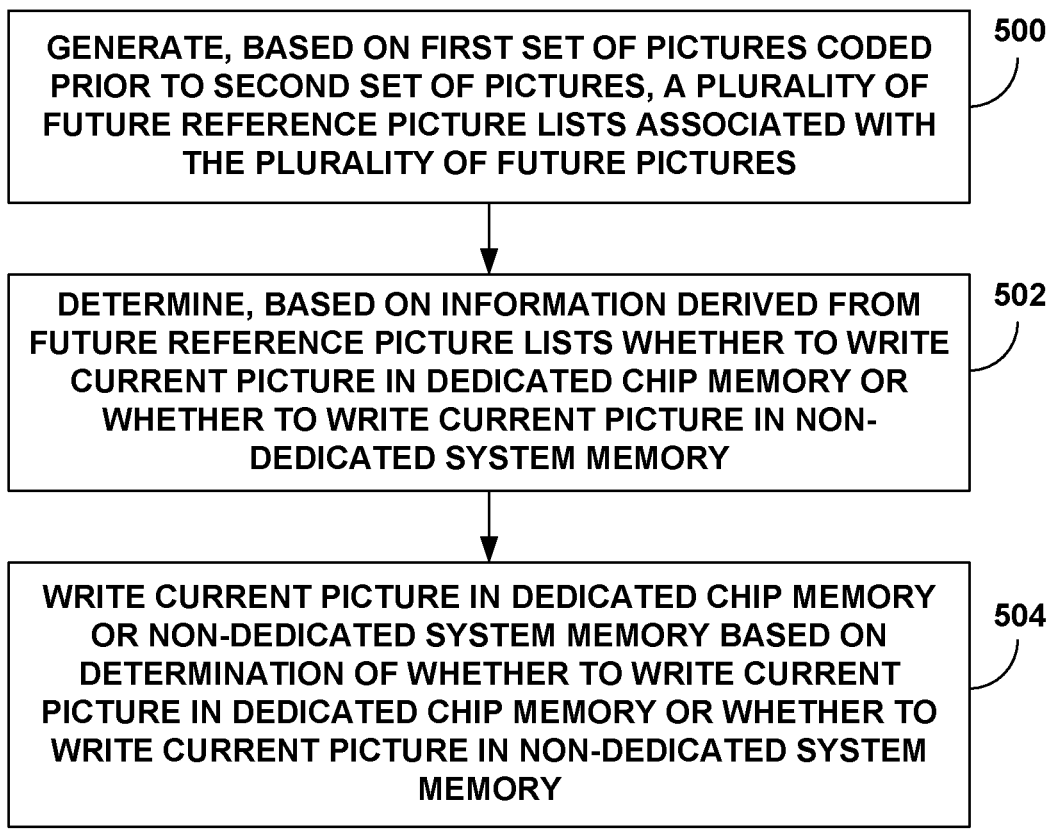
FIG. 5 is a flowchart illustrating an example method of determining whether current picture is written in dedicated chip memory or non-dedicated system memory in accordance with the techniques of this disclosure.

FIG. 5 is a flowchart illustrating an example method of determining whether current picture is written in dedicated chip memory or non-dedicated system memory in accordance with the techniques of this disclosure. For ease, the example of FIG. 5 is described with respect to video decoder 300.

Video decoder 300 (e.g., via storage circuit 314) may generate, based on a first set of pictures coded prior to a second set of pictures, a plurality of future reference picture lists associated with a plurality of future pictures (500). The second set of pictures includes a current picture and the plurality of future pictures, and the plurality of future pictures follow the current picture in decoding order. For instance, as described with respect to FIGS. 4A and 4B, to generate the plurality of future reference picture lists, video decoder 300 may determine respective previous pictures in the first set of pictures 400A located in a same relative coding order location in the first set of pictures 400A that the plurality of the future pictures are located in the second set of pictures 400B. Video decoder 300 may determine respective reference picture lists for the respective previous pictures, and generate respective plurality of future reference picture lists for each of the plurality of future pictures based on the determined respective reference picture lists for the respective previous pictures.

Video decoder 300 may determine, based on information derived from the plurality of future reference picture lists associated with the plurality of future pictures, whether to write the current picture in dedicated chip memory 324 or whether to write the current picture non-dedicated system memory 326 (502). As one example, video decoder 300 may select one of a dedicated chip memory and a non-dedicated system memory to which the current picture is written based on information derived from the plurality of future reference picture lists. In some examples, video decoder 300 may determine whether to write the current picture in the dedicated chip memory 324 or the non-dedicated system memory 326 prior to decoding the current picture.

Video decoder 300 may derive the information based on a number of times the current picture is identified among the plurality of future reference picture lists. Video decoder 300 may also determine a number of times a cached picture (e.g., picture stored in dedicated chip memory when the current picture is about to be decoded) is identified among the plurality of future reference picture lists. Video decoder 300 may determine whether to write the current picture in dedicated chip memory 324 or non-dedicated system memory 326 based on the number of times the current picture and the cached picture are identified among the plurality of future reference picture lists, such as number of times the current picture and the cached picture are identified in index 0 of list 0 of the future pictures, number of times the current picture and the cached picture are identified in index 0 of list 1 of the future pictures, number of times the current picture and the cached picture are identified in index 1 of list 0 of the future pictures, number of times the current picture and the cached picture are identified in index 1 of list 1 of the future pictures, or any combination thereof or any other index of list 0 or list 1 of the future pictures based on programmed level of complexity.

For example, video decoder 300 may derive a first metric from a number of times the current picture is identified among the plurality of future reference picture lists associated with the plurality of future pictures and derive a second metric associated with a cached picture stored in the dedicated chip memory 324 based on the plurality of future reference picture lists associated with the plurality of future pictures. Video decoder 300 may compare the first metric to the second metric, and determine whether to write the current picture in the dedicated chip memory 324 or the non-dedicated system memory 326 based on the comparison.

Video decoder 300 may write the current picture in the dedicated chip memory 324 or the non-dedicated system memory 326 based on the determination of whether to write the current picture in the dedicated chip memory 324 or whether to write the current picture in the non-dedicated system memory 326 (504). For instance, video decoder 300 may write the current picture to the selected on of the dedicated chip memory 324 or the non-dedicated system memory 326. For example, if video decoder 300 determines to write the current picture to dedicated chip memory 324, video decoder 300 may flush out the cached picture and store the cached picture in non-dedicated system memory 326. Video decoder 300 may then write the current picture to dedicated chip memory 324. If video decoder 300 determines to write the current picture to non-dedicated system memory 326, video decoder 300 may write the current picture to non-dedicated system memory 326 and leave the cached picture in dedicated chip memory 324.

As an example, as described with respect to FIG. 3, video decoder 300 may reconstruct the current picture. To write the current picture, video decoder 300 may write the current picture after or during the reconstruction of the current picture. For instance, storage circuit 314 may determine before the current picture is decoded that the current picture is to be written to dedicated chip memory 324. In this example, as blocks of the current picture are being reconstructed and output by filter unit 312 or reconstruction unit 310, storage circuit 314 may write the blocks to dedicated chip memory 324. That is, video decoder 300 may write the current picture after or during inter-prediction decoding of the current picture (e.g., reconstruction of the current picture based on a reference picture).

Assume that the current picture is written to dedicated chip memory 324. In some cases, prediction processing unit 304 may determine that the current picture is a reference picture for a future picture of the future pictures. Video decoder 300 may reconstruct the future picture based on accessing the current picture from dedicated chip memory 324.

Figure 6:
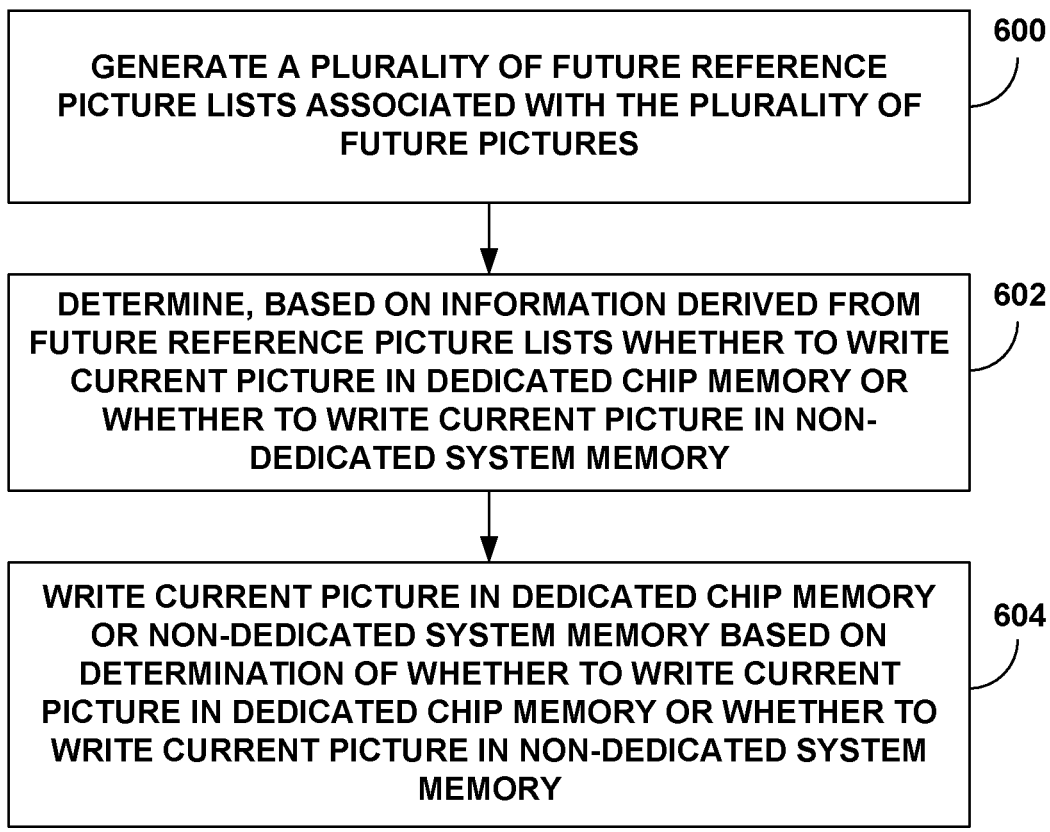
FIG. 6 is a flowchart illustrating another example method of determining whether current picture is written in dedicated chip memory or non-dedicated system memory in accordance with the techniques of this disclosure.

FIG. 6 is a flowchart illustrating another example method of determining whether current picture is written in dedicated chip memory or non-dedicated system memory in accordance with the techniques of this disclosure. For ease, the example of FIG. 6 is described with respect to video encoder 200.

Video encoder 200 (e.g., via storage circuit 218) may generate a plurality of future reference picture lists associated with the plurality of future pictures (600). Video encoder 200 may perform similar operations as those of video decoder 300 to generate the plurality of future reference picture lists. However, the example techniques are not so limited. Because video encoder 200, unlike video decoder 300, determines based on quality and compression calculations which pictures are to go into the reference picture lists, video encoder 200 may have already determined the reference picture lists for the future reference picture lists. At runtime, video encoder 200 may rely on the already generated future reference picture lists for the future pictures for the example techniques described in this disclosure. Accordingly, in one or more examples, the plurality of future reference picture lists may be predicted (e.g., by video decoder 300) or determined (e.g., by video encoder 200) future reference picture lists that identify pictures usable as reference pictures for the plurality of future pictures.

Video encoder 200 may determine, based on information derived from the plurality of future reference picture lists associated with the plurality of future pictures, whether to write the current picture in dedicated chip memory 230 or whether to write the current picture in non-dedicated system memory 240 (602). Video encoder 200 may select one of a dedicated chip memory 230 and a non-dedicated system memory 240 to which the current picture is written based on information derived from the plurality of future reference picture lists. In some examples, video encoder 200 may determine whether to write the current picture in the dedicated chip memory 230 or the non-dedicated system memory 240 prior to encoding the current picture.

Video encoder 200 may derive the information based on a number of times the current picture is identified among the plurality of future reference picture lists. Video encoder 200 may also determine a number of times a cached picture (e.g., picture stored in dedicated chip memory when the current picture is about to be decoded) is identified among the plurality of future reference picture lists. Video encoder 200 may determine whether to write the current picture in dedicated chip memory 230 or non-dedicated system memory 240 based on the number of times the current picture and the cached picture are identified among the plurality of future reference picture lists, such as number of times the current picture and the cached picture are identified in index 0 of list 0 of the future pictures, number of times the current picture and the cached picture are identified in index 0 of list 1 of the future pictures, number of times the current picture and the cached picture are identified in index 1 of list 0 of the future pictures, number of times the current picture and the cached picture are identified in index 1 of list 1 of the future pictures, or any combination thereof or any other index of list 0 or list 1 of the future pictures based on programmed level of complexity.

For example, video encoder 200 may derive a first metric from a number of times the current picture is identified among the plurality of future reference picture lists associated with the plurality of future pictures and derive a second metric associated with a cached picture stored in the dedicated chip memory 230 based on the plurality of future reference picture lists associated with the plurality of future pictures. Video decoder 300 may compare the first metric to the second metric, and determine whether to write the current picture in the dedicated chip memory 230 or the non-dedicated system memory 240 based on the comparison.

Video encoder 200 may write the current picture in the dedicated chip memory 230 or the non-dedicated system memory 240 based on the determination of whether to write the current picture in the dedicated chip memory 230 or whether to write the current picture in the non-dedicated system memory 240 (604). For instance, video encoder 200 may write the current picture to the selected on of the dedicated chip memory 230 or the non-dedicated system memory 240. For example, if video encoder 200 determines to write the current picture to dedicated chip memory 230, video encoder 200 may flush out the cached picture and store the cached picture in non-dedicated system memory 240.

Video encoder 200 may then write the current picture to dedicated chip memory 230. If video encoder 200 determines to write the current picture to non-dedicated system memory 240, video encoder 200 may write the current picture to non-dedicated system memory 240 and leave the cached picture in dedicated chip memory 230.

As an example, as described with respect to FIG. 2, video encoder 200 includes a reconstruction loop in which the encoded current picture is also reconstructed (e.g., via inverse quantization unit 210, inverse transform processing unit 212, reconstruction unit 214, and filter unit 216 (optionally)). To write the current picture, video encoder 200 may write the current picture after or during the reconstruction of the current picture. For instance, storage circuit 218 may determine before the current picture is encoded that the current picture is to be written to dedicated chip memory 230. In this example, as blocks of the current picture are being reconstructed in the reconstruction loop and output by filter unit 216 or reconstruction unit 214, storage circuit 218 may write the blocks to dedicated chip memory 230.

Assume that the current picture is written to dedicated chip memory 230. In some cases, mode selection unit 202 may determine that the current picture is a reference picture for a future picture of the future pictures. Video encoder 200 may encode the future picture based on accessing the current picture from dedicated chip memory 230.

Figure 7:
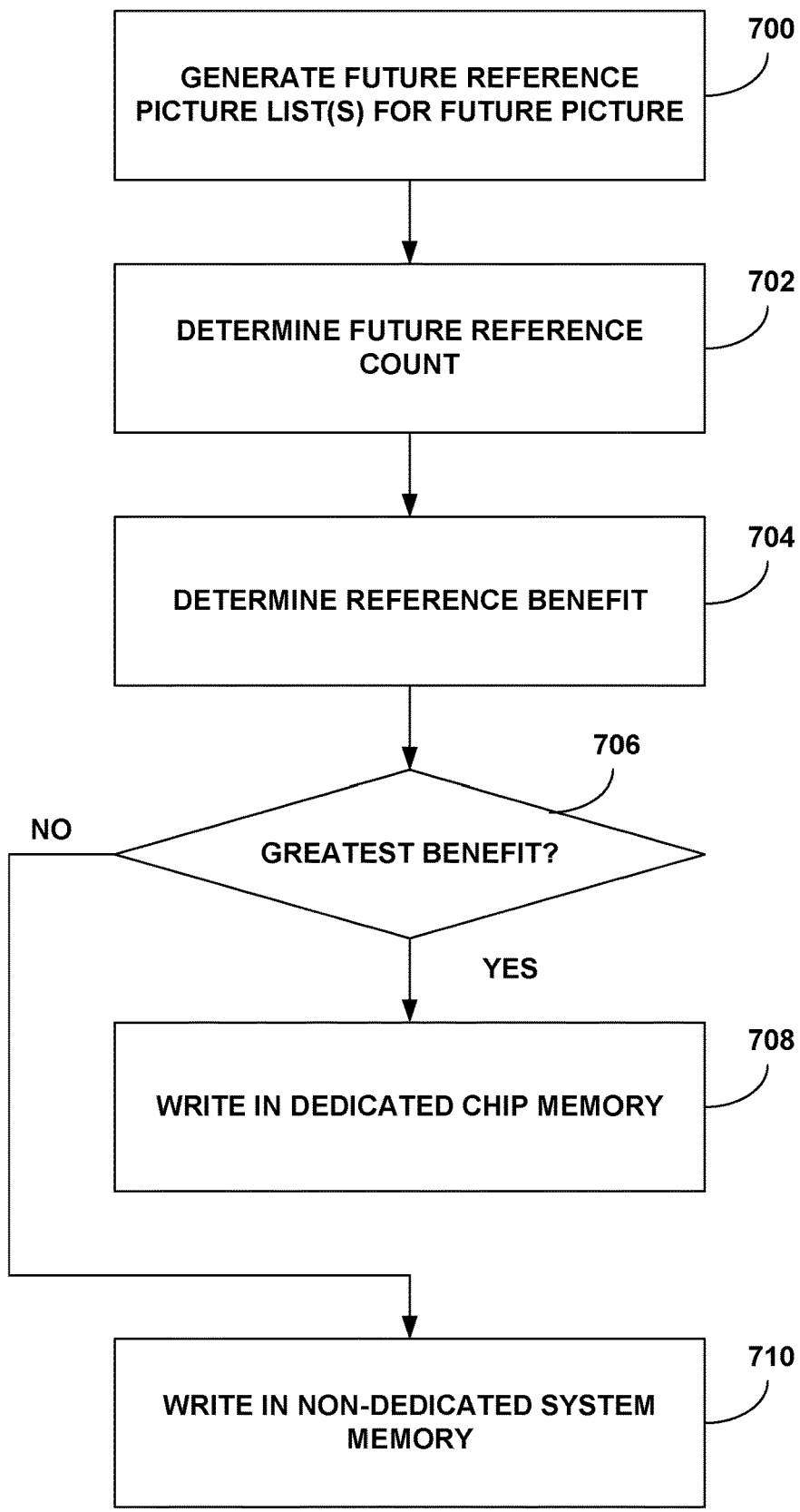
FIG. 7 is a flowchart illustrating another example method of determining whether current picture is written in dedicated chip memory or non-dedicated system memory in accordance with the techniques of this disclosure.

FIG. 7 is a flowchart illustrating another example method of determining whether current picture is written in dedicated chip memory or non-dedicated system memory in accordance with the techniques of this disclosure. For ease, FIG. 7 is described with respect to video decoder 300 and video encoder 200.

For instance, video encoder 200 and video decoder 300 may generate a plurality of future reference picture lists (e.g., future reference picture list 0 and/or list 1) associated with a plurality of future pictures of a set of pictures (700). The set of pictures includes a current picture and the plurality of future pictures, and the plurality of future pictures follow the current picture in coding order. For example, video decoder 300 may generate future reference picture list(s) based on previous set of pictures. Video decoder 300 may utilize the techniques described with respect to FIGS. 4A, 4B, and 5 to generate the future reference picture lists. Video encoder 200 may generate future reference picture list(s) similar to video decoder 300, or may generate future reference picture list(s) based on quality and compression calculations prior to runtime.

Video encoder 200 and video decoder 300 may determine future reference count (702). There are various examples of future reference count values for the current picture and the cached picture. Video encoder 200 and video decoder 300 may determine the future reference count for the current picture based on a number of times the current picture is identified in one or more entries of one or more of the future reference picture lists, and determine the future reference count for the cached picture based on a number of times the cached picture is identified in one or more entries of one or more of the future reference picture lists. The number of entries of the future reference picture list(s) that video encoder 200 and video decoder 300 may evaluate to determine the future reference count for the current picture or the cached picture may be based on various factors.

As one example, video encoder 200 and video decoder 300 may determine a first reference count indicative of a number of times the current picture is identified in index N (e.g., index 0) of list 0 of the future pictures, or determine a first reference count indicative of a number of times the current picture is identified in index N of list 1 of the future pictures, or determine a first reference count indicative of a number of times the current picture is identified in index N of list 0 and list 1 of the future pictures.

In some examples, video encoder 200 and video decoder 300 may determine a second reference count indicative of a number of times the current picture is identified in index X (e.g., index 1) of list 0 of the future pictures, or determine a second reference count indicative of a number of times the current picture is identified in index X of list 1 of the future pictures, or determine a second reference count indicative of a number of times the current picture is identified in index X of list 0 and list 1 of the future pictures.

It may be possible that video encoder 200 and video decoder 300 determine one of the example first reference count, and not one of the example second reference count, or vice-versa. It may be possible that video encoder 200 and video decoder 300 determine any combination of the first reference count and second reference count. It may also be possible that video encoder 200 and video decoder 300 determine additional reference counts indicative of a number of times the current picture is identified in more than index N and X of list 0, list 1, or both list 0 and list 1 of the future pictures. All of these examples are contemplated by the disclosure.

Similarly, video encoder 200 and video decoder 300 may determine a third reference count indicative of a number of times the cached picture is identified in index N (e.g., index 0) of list 0 of the future pictures, or determine a third reference count indicative of a number of times the cached picture is identified in index N of list 1 of the future pictures, or determine a third reference count indicative of a number of times the cached picture is identified in index N of list 0 and list 1 of the future pictures.

In some examples, video encoder 200 and video decoder 300 may determine a fourth reference count indicative of a number of times the cached picture is identified in index X (e.g., index 1) of list 0 of the future pictures, or determine a fourth reference count indicative of a number of times the cached picture is identified in index X of list 1 of the future pictures, or determine a fourth reference count indicative of a number of times the cached picture is identified in index X of list 0 and list 1 of the future pictures.

It may be possible that video encoder 200 and video decoder 300 determine one of the example third reference count, and not one of the example fourth reference count, or vice-versa. It may be possible that video encoder 200 and video decoder 300 determine any combination of the third reference count and fourth reference count. It may also be possible that video encoder 200 and video decoder 300 determines additional reference counts indicative of a number of times the cached picture is identified in more than index N and X of list 0, list 1, or both list 0 and list 1 of the future pictures. All of these examples are contemplated by the disclosure.

Video encoder 200 and video decoder 300 may determine reference benefit (704). In some examples, the reference benefit value for the current picture may be any one of the first reference count or second reference count, or some combination of the first reference count and the second reference count, or some combination of the first reference count, the second reference count, or additional reference counts. The reference benefit value for the cached picture may be any one of the third reference count or fourth reference count, or some combination of the third reference count and the fourth reference count, or some combination of the third reference count, the fourth reference count, or additional reference counts.

For instance, video encoder 200 and video decoder 300 may apply a first weight to the first reference count and a second weight to the second reference count to generate a reference benefit value for the current picture. Video encoder 200 and video decoder 300 may apply the first weight to the third reference count and the second weight to the fourth reference count to generate a reference benefit value for the cached picture.

Video encoder 200 and video decoder 300 may determine whether the reference benefit value for the current picture is greater than or less than the reference benefit value for the cached picture (706). If the reference benefit value for the current picture is greater than the reference benefit value for the cached picture (YES of 706), video encoder 200 and video decoder 300 may write the current picture to dedicated chip memory 230 or 324 (708). If the reference benefit value for the current picture is less than the reference benefit value for the cached picture (NO of 706), video encoder 200 and video decoder 300 may write the current picture to non-dedicated system memory 240 or 326 (710).

FIGS. 8-11 are flowcharts illustrating example methods of determining whether current picture is written in dedicated chip memory or non-dedicated system memory in accordance with the techniques of this disclosure. For ease, FIGS. 8-11 are described with example values from the following table. In the following table, assume that picture B4 is the current picture being encoded or decoded. Also, assume that picture I0 is stored in the dedicated chip memory.

The future pictures include pictures B2, B1, B3, and B6 (e.g., the search range is four pictures) and are in the same set of pictures as the current picture B4. There may be additional pictures in the set of pictures as well (e.g., in addition to the pictures that form the search range). Assume that storage circuit 218 and storage circuit 314 determined the future reference picture list 0 and list 1 for pictures B2, B1, B3, and B6 as described above, and the below table includes the pictures identified in the future reference picture lists.

TABLE 1

Future Reference Picture List Entries

| Picture | Index 0, list 0 | Index 0, list 1 | Index 1, list 0 | Index 1, list 1 |
|---------|-----------------|-----------------|-----------------|-----------------|
| B4 | NA | NA | NA | NA |
| B2 | I0 | B4 | B4 | B8 |
| B1 | I0 | B2 | B2 | B4 |
| B3 | B2 | B4 | I0 | B8 |
| B6 | B4 | B8 | I0 | B16 |

Figure 8:
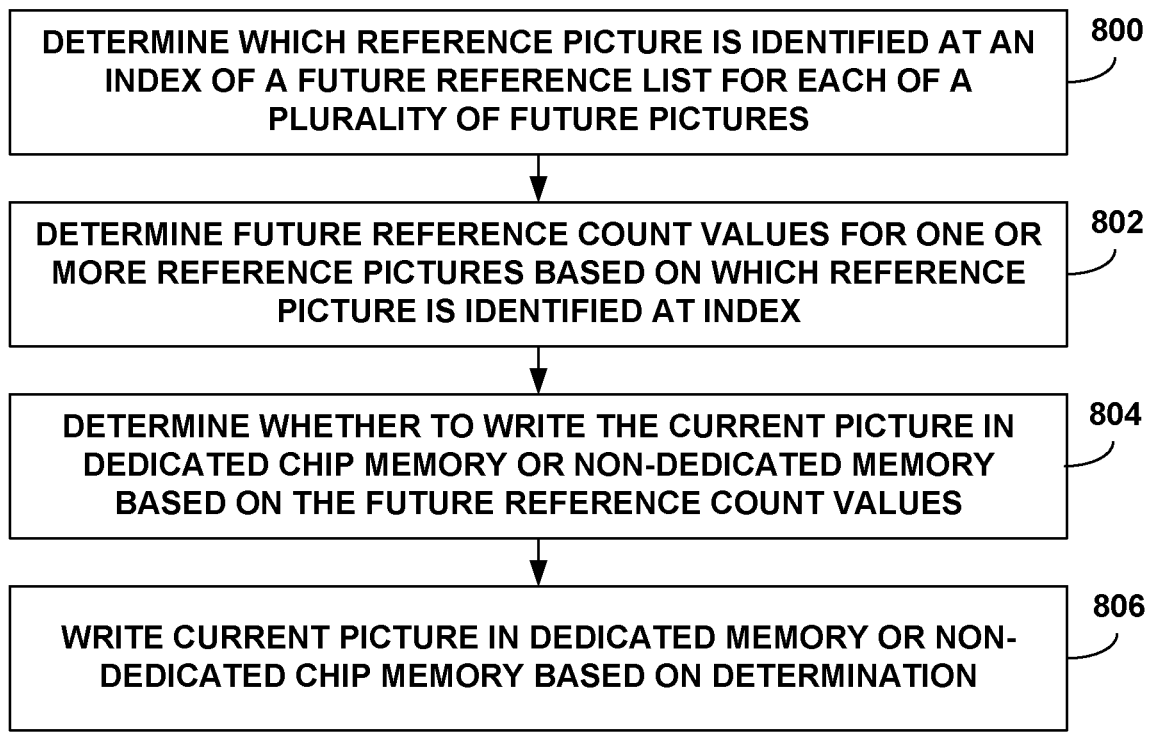
FIG. 8 is a flowchart illustrating another example method of determining whether current picture is written in dedicated chip memory or non-dedicated system memory in accordance with the techniques of this disclosure.

With respect to FIG. 8, video encoder 200 and video decoder 300 may determine which reference picture is identified at an index (e.g., entry) of a future reference picture list for each of a plurality of future pictures (800). For instance, video encoder 200 and video decoder 300 may determine that picture I0 is identified at index 0 (e.g., first entry) of list 0 for future picture B2, picture I0 is identified at index 0 (e.g., first entry) of list 0 for future picture B1, picture B2 is identified at index 0 (e.g., first entry) of list 0 for future picture B3, and picture B4 is identified at index 0 (e.g., first entry) of list 0 for future picture B6. Video encoder 200 and video decoder 300 may similarly determine which reference picture is identified at index 0 of list 1, index 1 of list 0, and index 1 of list 1 for future pictures B2, B1, B3, and B6.

Video encoder 200 and video decoder 300 may determine future reference count values for one or more reference pictures based on which reference picture is identified at the index (802). As one example, video encoder 200 and video decoder 300 may determine future reference count values for the current picture B4 and the cached picture I0.

For instance, one example of a future reference count value for the current picture B4 is one because current picture B4 is identified once in index 0, list 0 for pictures B2, B1, B3, and B6 (e.g., in index 0, list 0 of future picture B6). Another example of a future reference count value for the current picture B4 is two because current picture B4 is identified twice in index 0, list 1 for pictures B2, B1, B3, and B6 (e.g., in index 0, list 1 of future picture B2 and B3). Another example of a future reference count value for the current picture B4 is three because current picture B4 is identified three times in index 0 of list 0 or list 1 for pictures B2, B1, B3, and B6 (e.g., in index 0, list 0 of future picture B6 and index 0, list 1 of future picture B2 and B3).

One example of a future reference count value for the cached picture I0 is two because cached picture I0 is identified two in index 0, list 0 for pictures B2, B1, B3, and B6 (e.g., in index 0, list 0 of future picture B2 and B1). Another example of a future reference count value for the cached picture I0 is zero because cached picture I0 is not identified in index 0, list 1 for pictures B2, B1, B3, and B6. Another example of a future reference count value for the cached picture I0 is two because cached picture I0 is identified twice in index 0 of list 0 or list 1 for pictures B2, B1, B3, and B6 (e.g., in index 0, list 0 of future picture B2 and B1).

Video encoder 200 and video decoder 300 may determine whether to write the current picture in dedicated chip memory or non-dedicated system memory based on the future reference count values (804). As one example, video encoder 200 and video decoder 300 may compare the future reference count values for current picture B4 and cached picture I0, and determine whether to write the current picture in dedicated chip memory or non-dedicated system memory based on the comparison.

As another example, video encoder 200 and video decoder 300 may determine another metric, like reference benefit values, based on the reference count values, and determine whether to write the current picture to the dedicated chip memory or the non-dedicated system memory based on the reference benefit values. As one example, video encoder 200 and video decoder 300 may determine a number of times that current picture B4 and cached picture I0 are identified in index 1, list 0 or list 1 of future pictures B2, B1, B3, and B6. For instance, current picture B4 is identified twice in index 1, list 0 or list 1 of future pictures B2, B1, B3, and B6 (e.g., index 1, list 0 of future picture B2 and index 1, list 1 of future picture B1). Cached picture I0 is identified twice in index 1, list 0 or list 1 of future pictures B2, B1, B3, and B6 (e.g., index 1, list 0 of future pictures B3 and B6).

One example of the equation of the reference benefit for current picture B4 or cached picture I0 may be $\Sigma_{i=0} w_{refIdxInL0(i)} \times MFRC_{refIdxInL0(i)} + \Sigma_{i=0} w_{refIdxInL1(i)} \times MFRC_{refIdxInL1(i)}$. In this equation "i" refers to the index (e.g., entry), L0 refers to list 0, and L1 refers to list 1.

In the above equation, $MFRC_{refIdxInL0(i)}$ for current picture B4 is the number of times current picture B4 is identified in index i of list 0 for future pictures B2, B1, B3, and B6. $MFRC_{refIdxInL0(i)}$ for cached picture I0 is the number of times cached picture I0 is identified in index i of list 0 for future pictures B2, B1, B3, and B6. In this example, $MFRC_{refIdxInL0(i)}$ for i=0 for current picture B4 is one, and $MFRC_{refIdxInL0(i)}$ for i=0 for cached picture I0 is two. $MFRC_{refIdxInL0(i)}$ for i=1 for current picture B4 is one, and $MFRC_{refIdxInL0(i)}$ for i=1 for cached picture I0 is two.

$MFRC_{refIdxInL1(i)}$ for current picture B4 is the number of times current picture B4 is identified in index i of list 1 for future pictures B2, B1, B3, and B6. $MFRC_{refIdxInL1(i)}$ for cached picture I0 is the number of times cached picture I0 is identified in index i of list 1 for future pictures B2, B1, B3, and B6. In this example, $MFRC_{refIdxInL1(i)}$ for i=0 for current picture B4 is two, and $MFRC_{refIdxInL1(i)}$ for i=0 for cached picture I0 is zero. $MFRC_{refIdxInL1(i)}$ for i=1 for current picture B4 is one, and $MFRC_{refIdxInL1(i)}$ for i=1 for cached picture I0 is zero.

$w_{refIdxInL0(i)}$ is equal to a weight applied to $MFRC_{refIdxInL0(i)}$. In some examples, $w_{refIdxInL0(i)}$ for i=0 is equal to 10, and for i=1 is equal to 1. $w_{refIdxInL1(i)}$ is equal to a weight applied to $MFRC_{refIdxInL1(i)}$. In some examples, $w_{refIdxInL1(i)}$ for i=0 is equal to 10, and for i=1 is equal to 1. It is possible for $w_{refIdxInL0(i)}$ and $w_{refIdxInL1(i)}$ to have different values, and the above values are merely examples.

Accordingly, for current picture B4, $w_{refIdxInL0(i)} \times MFRC_{refIdxInL0(i)}$ is equal to (10)*(1) for i=0 and (1)*(1) for i=1. Therefore, $\Sigma_{i=0} w_{refIdxInL0(i)} \times MFRC_{refIdxInL0(i)}$ for current picture B4 is 11. For current picture B4, $w_{refIdxInL1(i)} \times MFRC_{refIdxInL1(i)}$ is equal to (10)*(2) for i=0 and (1)*(1) for i=1. Therefore, $\Sigma_{i=0} w_{refIdxInL0(i)} \times MFRC_{refIdxInL0(i)}$ for current picture B4 is 21. Therefore, the reference benefit value for current picture B4 is $\Sigma_{i=0} w_{refIdxInL0(i)} \times MFRC_{refIdxInL0(i)} + \Sigma_{i=0} w_{refIdxInL1(i)} \times MFRC_{refIdxInL1(i)}$, which is 11+21=32.

In the above equation, $MFRC_{refIdxInL0(i)}$ for current picture B4 is the number of times current picture B4 is identified in index i of list 0 for future pictures B2, B1, B3, and B6. $MFRC_{refIdxInL0(i)}$ for cached picture I0 is the number of times cached picture I0 is identified in index i of list 0 for future pictures B2, B1, B3, and B6. In this example, $MFRC_{refIdxInL0(i)}$ for i=0 for current picture B4 is one, and $MFRC_{refIdxInL0(i)}$ for i=0 for cached picture I0 is two. $MFRC_{refIdxInL0(i)}$ for i=1 for current picture B4 is one, and $MFRC_{refIdxInL0(i)}$ for i=1 for cached picture I0 is two.

$MFRC_{refIdxInL1(i)}$ for current picture B4 is the number of times current picture B4 is identified in index i of list 1 for future pictures B2, B1, B3, and B6. $MFRC_{refIdxInL1(i)}$ for cached picture I0 is the number of times cached picture I0 is identified in index i of list 1 for future pictures B2, B1, B3, and B6. In this example, $MFRC_{refIdxInL1(i)}$ for i=0 for current picture B4 is two, and $MFRC_{refIdxInL1(i)}$ for i=0 for cached picture I0 is zero. $MFRC_{refIdxInL1(i)}$ for i=1 for current picture B4 is one, and $MFRC_{refIdxInL1(i)}$ for i=1 for cached picture I0 is zero.

$w_{refIdxInL0(i)}$ is equal to a weight applied to $MFRC_{refIdxInL0(i)}$. In some examples, $w_{refIdxInL0(i)}$ for i=0 is equal to 10, and for i=1 is equal to 1. $w_{refIdxInL1(i)}$ is equal to a weight applied to $MFRC_{refIdxInL1(i)}$. In some examples, $w_{refIdxInL1(i)}$ for i=0 is equal to 10, and for i=1 is equal to 1. It is possible for $w_{refIdxInL0(i)}$ and $w_{refIdxInL1(i)}$ to have different values, and the above values are merely examples.

Accordingly, for current picture B4, $w_{refIdxInL0(i)} \times MFRC_{refIdxInL0(i)}$ is equal to (10)*(1) for i=0 and (1)*(1) for i=1. Therefore, $\Sigma_{i=0} w_{refIdxInL0(i)} \times MFRC_{refIdxInL0(i)}$ for current picture B4 is 11. For current picture B4, $w_{refIdxInL1(i)} \times MFRC_{refIdxInL1(i)}$ is equal to (10)*(2) for i=0 and (1)*(1) for i=1. Therefore, $\Sigma_{i=0} w_{refIdxInL1(i)} \times MFRC_{refIdxInL1(i)}$ for current picture B4 is 21. Therefore, the reference benefit value for current picture B4 is $\Sigma_{i=0} w_{refIdxInL0(i)} \times MFRC_{refIdxInL0(i)} + \Sigma_{i=0} w_{refIdxInL1(i)} \times MFRC_{refIdxInL1(i)}$, which is 11+21=32.

Accordingly, for cached picture I0, $w_{refIdxInL0(i)} \times MFRC_{refIdxInL0(i)}$ is equal to (10)*(2) for i=0 and (1)*(2) for i=1. Therefore, $\Sigma_{i=0} w_{refIdxInL0(i)} \times MFRC_{refIdxInL0(i)}$ for cached picture I0 is 22. For cached picture I0, $w_{refIdxInL1(i)} \times MFRC_{refIdxInL1(i)}$ is equal to (10)*(0) for i=0 and (1)*(0) for i=1. Therefore, $\Sigma_{i=0} w_{refIdxInL1(i)} \times MFRC_{refIdxInL1(i)}$ for cached picture I0 is 0. Therefore, the reference benefit value for cached picture I0 is $\Sigma_{i=0} w_{refIdxInL0(i)} \times MFRC_{refIdxInL0(i)} + \Sigma_{i=0} w_{refIdxInL1(i)} \times MFRC_{refIdxInL1(i)}$, which is 22+0=22.

From the above, the reference benefit value for current picture B4 is 32, and the reference benefit value for cached picture I0 is 22. Because the reference benefit value for current picture B4 is greater than the reference benefit vale for cached picture I0, video encoder 200 and video decoder 300 may determine to write current picture B4 in dedicated chip memory instead of non-dedicated system memory.

The above equation for calculating the reference benefit value is one example, and there may be other examples. For instance, examples of the equation for the reference benefit value may be the following, as a few non-limiting examples:

$$\text{Reference benefit value} = \sum_i MFRC_{refIdxInL0(i)}$$

$$\text{Reference benefit value} = \sum_i MFRC_{refIdxInL1(i)}$$

$$\text{Reference benefit value} = \sum_{i=0} w_{refIdxInL0(i)} \times MFRC_{refIdxInL0(i)}$$

$$\text{Reference benefit value} = \sum_{i=0} w_{refIdxInL1(i)} \times MFRC_{refIdxInL1(i)}$$

Reference benefit value =

$$\sum_{i=0} w_{refIdxInL0(i)} \times MFRC_{refIdxInL0(i)} + \sum_{i=0} w_{refIdxInL1(i)} \times MFRC_{refIdxInL1(i)}$$

In the above example, video encoder 200 and video decoder 300 considered reference pictures in both list 0 and list 1 of future pictures. However, the example techniques may not be so limited. The examples described in FIGS. 9-11 build on each other. For example, the example of FIG. 9 uses entries in only index 0, list 0 to determine whether to write current picture B4 in dedicated chip memory or non-dedicated system memory. FIG. 10 builds on FIG. 9, and the example of FIG. 10 uses entries in index 0, list 0 and list 1 to determine whether to write current picture B4 in dedicated chip memory or non-dedicated system memory. FIG. 11 builds on FIG. 10, and the example of FIG. 11 uses entries in index 0 and index 1 of list 0 and list 1 to determine whether to write current picture B4 in dedicated chip memory or non-dedicated system memory.

Figure 9:
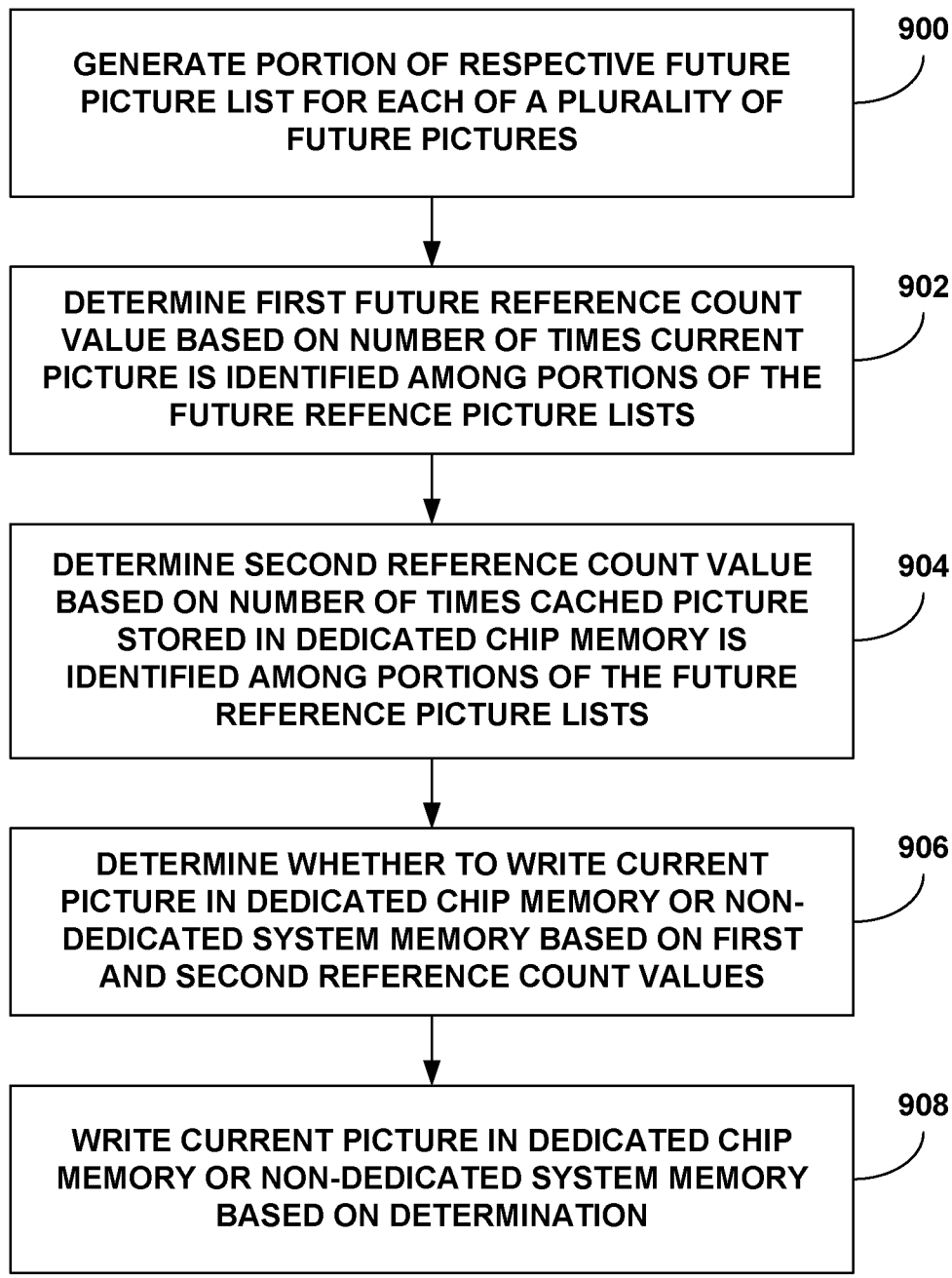
FIG. 9 is a flowchart illustrating another example method of determining whether current picture is written in dedicated chip memory or non-dedicated system memory in accordance with the techniques of this disclosure.
Figure 10:
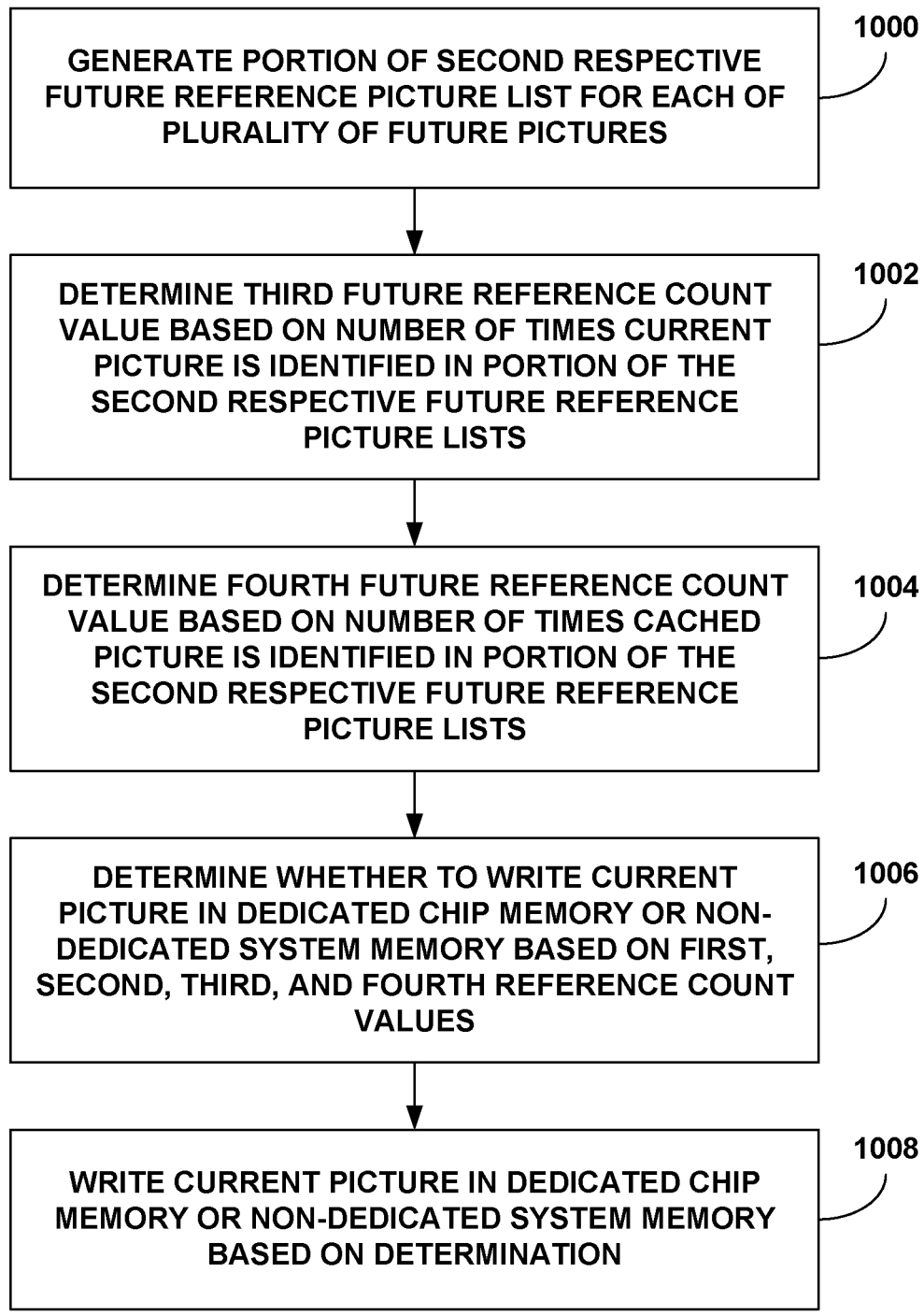
FIG. 10 is a flowchart illustrating another example method of determining whether current picture is written in dedicated chip memory or non-dedicated system memory in accordance with the techniques of this disclosure.
Figure 11:
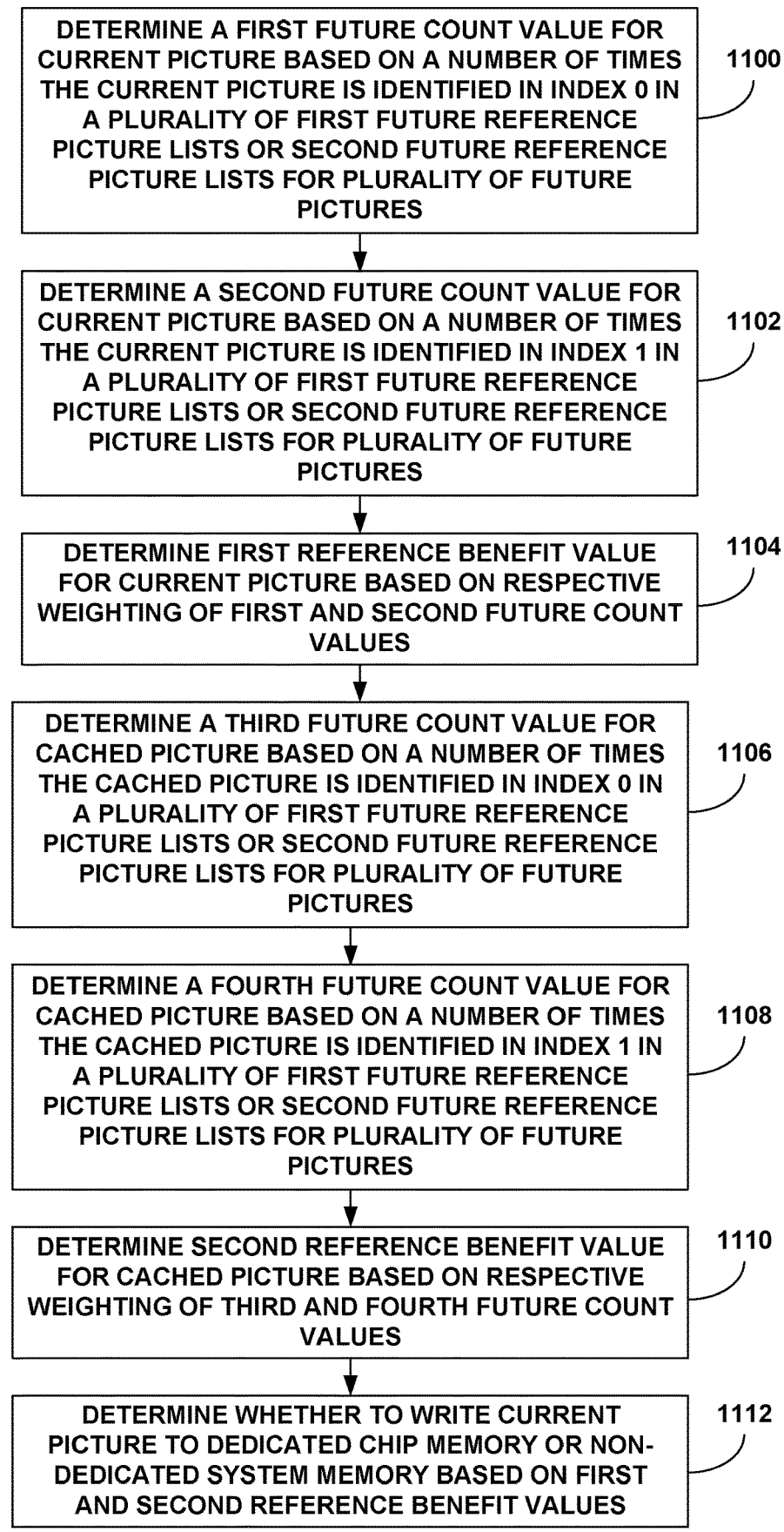
FIG. 11 is a flowchart illustrating another example method of determining whether current picture is written in dedicated chip memory or non-dedicated system memory in accordance with the techniques of this disclosure.

Video encoder 200 and video decoder 300 may be configured to perform the example techniques of any of FIGS. 9-11. Also, although FIG. 9 uses list 0, it may be possible to use list 1 in FIG. 9.

Referring to FIG. 9, video encoder 200 and video decoder 300 may generate a portion of respective future reference picture list for each of a plurality of future pictures (900). For instance, as shown in Table 1, video encoder 200 and video decoder 300 may generate future reference picture list 0 for the first two entries for future pictures B2, B1, B3, and B6. Accordingly, in this disclosure, generating a future reference picture list includes examples of generating a portion or all of the future reference picture list.

Video encoder 200 and video decoder 300 may determine a first future reference count value based on a number of times current picture B4 is identified among portions of the future reference picture lists (902). For instance, video encoder 200 and video decoder 300 may determine a first future reference count value for current picture B4 to be equal to one if only index 0, list 0 of future pictures B2, B1, B3, and B6 is considered.

Video encoder 200 and video decoder 300 may determine a second future reference count value based on a number of times cached picture I0 is identified among portions of the future reference picture lists (904). For instance, video encoder 200 and video decoder 300 may determine a second future reference count value for cached picture I0 to be equal to two if only index 0, list 0 of future pictures B2, B1, B3, and B6 is considered.

Video encoder 200 and video decoder 300 may determine whether to write current picture B4 in dedicated chip memory or non-dedicated system memory based on first and second reference count values (906). For instance, if reference benefit values for current picture B4 and cached picture I0 are set equal to the first and second reference counts, respectively, then video encoder 200 and video decoder 300 may determine to write the current picture B4 in dedicated chip memory if reference count value for current picture B4 is greater than reference count value for cached picture I0. In some examples, video encoder 200 and video decoder 300 may determine reference benefit values for current picture B4 or cached picture I0 using any one of the reference benefit value equations described above.

Video encoder 200 and video decoder 300 may write the current picture B4 in dedicated chip memory or non-dedicated system memory based on the determination of whether to write the current picture B4 in dedicated chip memory or non-dedicated system memory (908). For instance, if determined to write to dedicated chip memory, video encoder 200 and video decoder 300 may move cached picture I0 from dedicated chip memory to non-dedicated system memory, and write current picture B4 in dedicated chip memory. Otherwise, video encoder 200 and video decoder 300 may write current picture B4 to non-dedicated system memory.

In the example of FIG. 9, only list 0 for future pictures B2, B1, B3, and B6 are considered. However, the example techniques are not so limited, and only list 1 for future pictures B2, B1, B3, and B6 may be considered. In some examples, video encoder 200 and video decoder 300 may consider both list 0 and list 1.

For instance, FIG. 10 illustrates examples that build on the example of FIG. 9. Video encoder 200 and video decoder 300 may generate a portion of second respective future reference picture list for each of a plurality of future pictures (1000). For instance, as shown in Table 1, in addition to list 0, video encoder 200 and video decoder 300 may generate future reference picture list 1 for the first two entries for future pictures B2, B1, B3, and B6. Accordingly, in this disclosure, generating a future reference picture list includes examples of generating a portion or all of the future reference picture list.

Video encoder 200 and video decoder 300 may determine a third future reference count value based on a number of times current picture B4 is identified among portions of the second respective future reference picture lists (1002). For instance, video encoder 200 and video decoder 300 may determine a third future reference count value for current picture B4 to be equal to two if only index 0, list 1 of future pictures B2, B1, B3, and B6 is considered, or equal to three if index 0, list 0 and list 1 of future pictures B2, B1, B3, and B6 are considered.

Video encoder 200 and video decoder 300 may determine a fourth future reference count value based on a number of times cached picture I0 is identified among portions of the second respective future reference picture lists (1004). For instance, video encoder 200 and video decoder 300 may determine a fourth future reference count value for cached picture I0 to be equal to zero if only index 0, list 1 of future pictures B2, B1, B3, and B6 is considered, or equal to two if index 0, list 0 and list 1 of future pictures B2, B1, B3, and B6 are considered.

Video encoder 200 and video decoder 300 may determine whether to write current picture B4 in dedicated chip memory or non-dedicated system memory based on first, second, third, and fourth reference count values (1006). For instance, video encoder 200 and video decoder 300 may determine a reference benefit value for current picture B4 based on the first and third reference count values, and determine a reference benefit value for cached picture I0 based on the second and fourth reference count values. Video encoder 200 and video decoder 300 may determine whether to write the current picture B4 in dedicated chip memory or non-dedicated system memory based on the reference benefit value for the current picture B4 and the cached picture I0. In some examples, video encoder 200 and video decoder 300 may determine reference benefit values for current picture B4 or cached picture I0 using any one of the reference benefit value equations described above.

Video encoder 200 and video decoder 300 may write the current picture B4 in dedicated chip memory or non-dedicated system memory based on the determination of whether to write the current picture B4 in dedicated chip memory or non-dedicated system memory (1008). For instance, if determined to write to dedicated chip memory, video encoder 200 and video decoder 300 may move cached picture I0 from dedicated chip memory to non-dedicated system memory, and write current picture B4 in dedicated chip memory. Otherwise, video encoder 200 and video decoder 300 may write current picture B4 to non-dedicated system memory.

Referring to FIG. 11, video encoder 200 and video decoder 300 may determine a first future count value for current picture B4 based on a number of times current picture B4 is identified in index 0 (e.g., first entry) in a plurality of first future reference picture lists (e.g., list 0) or second future reference picture lists (e.g., list 1) for plurality of future pictures (1100). For instance, the first future reference count value for current picture B4 is three because current picture B4 is identified three times in index 0, list 0 and index 0, list 1 in Table 1.

Video encoder 200 and video decoder 300 may determine a second future count value for current picture B4 based on a number of times current picture B4 is identified in index 1 (e.g., second entry) in a plurality of first future reference picture lists (e.g., list 0) or second future reference picture lists (e.g., list 1) for plurality of future pictures (1102). For instance, the second future reference count value for current picture B4 is two because current picture B4 is identified twice in index 1, list 0 and index 1, list 1 in Table 1.

Video encoder 200 and video decoder 300 may determine a first reference benefit value for current picture B4 based on respective weighting of first and second future count values (1104). For instance, assume that the first weighting for the first future count value is 10, and the second weighting for the second future count value is 1. In this example, video encoder 200 and video decoder 300 may multiply the first weighting with the first reference count value for current picture B4 (e.g., 10*3=30), multiple the second weighting with the second reference count value for current picture B4 (e.g., 1*2=2), and add the result (e.g., 30+2=32).

Video encoder 200 and video decoder 300 may determine a third future count value for cached picture I0 based on a number of times cached picture I0 is identified in index 0 (e.g., first entry) in a plurality of first future reference picture lists (e.g., list 0) or second future reference picture lists (e.g., list 1) for plurality of future pictures (1106). For instance, the third future reference count value for cached picture I0 is two because cached picture I0 is identified twice in index 0, list 0 and index 0, list 1 in Table 1.

Video encoder 200 and video decoder 300 may determine a fourth future count value for cached picture I0 based on a number of times cached picture I0 is identified in index 1 (e.g., second entry) in a plurality of first future reference picture lists (e.g., list 0) or second future reference picture lists (e.g., list 1) for plurality of future pictures (1108). For instance, the fourth future reference count value for cached picture I0 is two because cached picture I0 is identified twice in index 1, list 0 and index 1, list 1 in Table 1.

Video encoder 200 and video decoder 300 may determine a second reference benefit value for cached picture I0 based on respective weighting of third and fourth future count values (1110). For instance, assume that the third weighting for the third future count value is 10, and the fourth weighting for the fourth future count value is 1. In this example, video encoder 200 and video decoder 300 may multiply the third weighting with the third reference count value for cached picture I0 (e.g., 10*2=20), multiple the fourth weighting with the fourth reference count value for cached picture I0 (e.g., 1*2=2), and add the result (e.g., 20+2=22).

Video encoder 200 and video decoder 300 may determine whether to write current picture B4 in dedicated chip memory or non-dedicated system memory based on the first and second reference benefit values (1112). In this example, because the first reference benefit value for current picture B4 is greater than the second reference benefit value for cached picture I0, video encoder 200 and video decoder 300 may determine to write current picture B4 in dedicated chip memory.

The following example techniques may be used separately or in any combination.

Clause 1A. A method of processing video data, the method comprising: generating a plurality of future reference picture lists associated with a plurality of future pictures of a set of pictures, wherein the set of pictures includes a current picture and the plurality of future pictures, and the plurality of future pictures follow the current picture in coding order; determining, based on information derived from the plurality of future reference picture lists associated with the plurality of future pictures, whether to write the current picture in a dedicated chip memory or whether to write the current picture in a non-dedicated system memory; and writing the current picture in the dedicated chip memory or the non-dedicated system memory based on the determination of whether to write the current picture in the dedicated chip memory or whether to write the current picture the non-dedicated system memory.

Clause 2A. The method of clause 1A, wherein the set of pictures comprises a second set of pictures, wherein generating the plurality of future reference picture lists comprises generating, based on a first set of pictures coded prior to the second set of pictures, the plurality of future reference picture lists associated with the plurality of future pictures, and wherein writing the current picture comprises writing the current picture after or during inter-prediction decoding of the current picture.

Clause 3A. The method of clause 2A, wherein generating the plurality of future reference picture lists comprises: determining respective previous pictures in the first set of pictures located in a same relative coding order location in the first set of pictures that the plurality of the future pictures are located in the second set of pictures; determining respective reference picture lists for the respective previous pictures; and generating respective plurality of future reference picture lists for each of the plurality of future pictures based on the determined respective reference picture lists for the respective previous pictures.

Clause 4A. The method of any of clauses 1A-3A, wherein the set of pictures includes the current picture, the plurality of future pictures, and one or more additional pictures.

Clause 5A. The method of any of clauses 1A-4A, wherein determining whether to write the current picture in the dedicated chip memory or in the non-dedicated system memory comprises determining whether to write the current picture in the dedicated chip memory or the non-dedicated system memory prior to encoding or decoding the current picture.

Clause 6A. The method of any of clauses 1A-5A, further comprising: deriving the information based on a number of times the current picture is identified among the plurality of future reference picture lists.

Clause 7A. The method of any of clauses 1A-6A, wherein the information comprises a first metric derived from a number of times the current picture is identified among the plurality of future reference picture lists associated with the plurality of future pictures, the method further comprising: deriving a second metric associated with a cached picture stored in the dedicated chip memory based on the plurality of future reference picture lists associated with the plurality of future pictures; and comparing the first metric to the second metric, wherein determining whether to write the current picture in the dedicated chip memory or the non-dedicated system memory comprises determining whether to write the current picture in the dedicated chip memory or the non-dedicated system memory based on the comparison of the first metric to the second metric.

Clause 8A. The method of clause 7A, wherein determining whether to write the current picture in the dedicated chip memory or the non-dedicated system memory comprises determining to write the current picture in the dedicated chip memory based on the first metric being greater than the second metric.

Clause 9A. The method of any of clauses 1A-8A, further comprising: reconstructing the current picture, wherein writing the current picture comprises writing the current picture after or during the reconstruction of the current picture.

Clause 10A. The method of clause 9A, wherein reconstructing the current picture comprises reconstructing the current picture as part of a reconstruction loop for video encoding.

Clause 11A. The method of any of clauses 1A-10A, wherein determining whether to write the current picture in the dedicated chip memory or the non-dedicated system memory comprises determining to write the current picture in the dedicated chip memory, the method further comprising: determining that the current picture is a reference picture for a future picture of the future pictures; and reconstructing the future picture based on accessing the current picture from the dedicated chip memory.

Clause 12A. A device for processing video data, the device comprising: a dedicated chip memory; and processing circuitry coupled to the dedicated chip memory and configured to: generate a plurality of future reference picture lists associated with a plurality of future pictures of a set of pictures, wherein the set of pictures includes a current picture and the plurality of future pictures, and the plurality of future pictures follow the current picture in coding order; determine, based on information derived from the plurality of future reference picture lists associated with the plurality of future pictures, whether to write the current picture in the dedicated chip memory or whether to write the current picture in a non-dedicated system memory; and write the current picture in the dedicated chip memory or the non-dedicated system memory based on the determination of whether to write the current picture in the dedicated chip memory or whether to write the current picture in the non-dedicated system memory.

Clause 13A. The device of clause 12A, wherein the set of pictures comprises a second set of pictures, wherein to generate the plurality of future reference picture lists, the processing circuitry is configured to generate, based on a first set of pictures coded prior to the second set of pictures, the plurality of future reference picture lists associated with the plurality of future pictures, and wherein to write the current picture, the processing circuitry is configured to write the current picture after or during inter-prediction decoding of the current picture.

Clause 14A. The device of clause 13A, wherein to generate the plurality of future reference picture lists, the processing circuitry is configured to: determine respective previous pictures in the first set of pictures located in a same relative coding order location in the first set of pictures that the plurality of the future pictures are located in the second set of pictures; determine respective reference picture lists for the respective previous pictures; and generate respective plurality of future reference picture lists for each of the plurality of future pictures based on the determined respective reference picture lists for the respective previous pictures.

Clause 15A. The device of any of clauses 12A-14A, wherein the set of pictures includes the current picture, the plurality of future pictures, and one or more additional pictures.

Clause 16A. The device of any of clauses 12A-15A, wherein to determine whether to write the current picture in the dedicated chip memory or the non-dedicated system memory, the processing circuitry is configured to determine whether to write the current picture in the dedicated chip memory or the non-dedicated system memory prior to encoding or decoding the current picture.

Clause 17A. The device of any of clauses 12A-16A, wherein the processing circuitry is configured to: derive the information based on a number of times the current picture is identified among the plurality of future reference picture lists.

Clause 18A. The device of any of clauses 12A-17A, wherein the information comprises a first metric derived from a number of times the current picture is identified among the plurality of future reference picture lists associated with the plurality of future pictures, and wherein the processing circuitry is configured to: derive a second metric associated with a cached picture stored in the dedicated chip memory based on the plurality of future reference picture lists associated with the plurality of future pictures; and compare the first metric to the second metric, wherein to determine whether to write the current picture in the dedicated chip memory or the non-dedicated system memory, the processing circuitry is configured to determine whether to write the current picture in the dedicated chip memory or the non-dedicated system memory based on the comparison of the first metric to the second metric.

Clause 19A. The device of clause 18A, wherein to determine whether to write the current picture in the dedicated chip memory or the non-dedicated system memory, the processing circuitry is configured to determine to write the current picture in the dedicated chip memory based on the first metric being greater than the second metric.

Clause 20A. The device of any of clauses 12A-19A, wherein the processing circuitry is configured to: reconstruct the current picture, wherein to write the current picture, the processing circuitry is configured to write the current picture after or during the reconstruction of the current picture.

Clause 21A. The device of clause 20A, wherein to reconstruct the current picture, the processing circuitry is configured to reconstruct the current picture as part of a reconstruction loop for video encoding.

Clause 22A. The device of any of clauses 12A-21A, wherein to determine whether to write the current picture in the dedicated chip memory or the non-dedicated system memory, the processing circuitry is configured to determine to write the current picture in the dedicated chip memory, and wherein the processing circuitry is configured to: determine that the current picture is a reference picture for a future picture of the future pictures; and reconstruct the future picture based on accessing the current picture from the dedicated chip memory.

Clause 23A. One or more computer-readable storage media storing instructions that when executed cause one or more processors to: generate a plurality of future reference picture lists associated with a plurality of future pictures of a set of pictures, wherein the set of pictures includes a current picture and the plurality of future pictures, and the plurality of future pictures follow the current picture in coding order; determine, based on information derived from the plurality of future reference picture lists associated with the plurality of future pictures, whether to write the current picture in a dedicated chip memory or whether to write the current picture in a non-dedicated system memory; and write the current picture in the dedicated chip memory or the non-dedicated system memory based on the determination of whether to write the current picture in the dedicated chip memory or whether to write the current picture the non-dedicated system memory.

Clause 24A. The one or more computer-readable storage media of clause 23A, wherein the set of pictures comprises a second set of pictures, wherein the instructions that cause the one or more processors to generate the plurality of future reference picture lists comprise instructions that cause the one or more processors to generate, based on a first set of pictures coded prior to the second set of pictures, the plurality of future reference picture lists associated with the plurality of future pictures, and wherein the instructions that cause the one or more processors to write the current picture comprise instructions that cause the one or more processors to write the current picture after or during inter-prediction decoding of the current picture.

Clause 25A. The one or more computer-readable storage media of clause 24A, wherein the instructions that cause the one or more processors to generate the plurality of future reference picture lists comprise instructions that cause the one or more processors to: determine respective previous pictures in the first set of pictures located in a same relative coding order location in the first set of pictures that the plurality of the future pictures are located in the second set of pictures; determine respective reference picture lists for the respective previous pictures; and generate respective plurality of future reference picture lists for each of the plurality of future pictures based on the determined respective reference picture lists for the respective previous pictures.

Clause 26A. The one or more computer-readable storage media of any of clauses 23A-25A, wherein the instructions that cause the one or more processors to determine whether to write the current picture in the dedicated chip memory or in the non-dedicated system memory comprise instructions that cause the one or more processors to determine whether to write the current picture in the dedicated chip memory or the non-dedicated system memory prior to encoding or decoding the current picture.

Clause 27A. The one or more computer-readable storage media of any of clauses 23A-26A, further comprising instructions that cause the one or more processors to: deriving the information based on a number of times the current picture is identified among the plurality of future reference picture lists.

Clause 28A. The one or more computer-readable storage media of any of clauses 23A-27A, wherein the information comprises a first metric derived from a number of times the current picture is identified among the plurality of future reference picture lists associated with the plurality of future pictures, and wherein the instructions further comprise instructions that cause the one or more processors to: derive a second metric associated with a cached picture stored in the dedicated chip memory based on the plurality of future reference picture lists associated with the plurality of future pictures; and compare the first metric to the second metric, wherein the instructions that cause the one or more processors to determine whether to write the current picture in the dedicated chip memory or the non-dedicated system memory comprise instructions that cause the one or more processors to determine whether to write the current picture in the dedicated chip memory or the non-dedicated system memory based on the comparison of the first metric to the second metric.

Clause 29A. One or more computer-readable storage media storing instructions that when executed cause one or more processors to: perform the method of any of clauses 1A-11A.

Clause 30A. A device for processing video data, the device comprising: means for generating a plurality of future reference picture lists associated with a plurality of future pictures of a set of pictures, wherein the set of pictures includes a current picture and the plurality of future pictures, and the plurality of future pictures follow the current picture in coding order; means for determining, based on information derived from the plurality of future reference picture lists associated with the plurality of future pictures, whether to write the current picture in a dedicated chip memory or whether to write the current picture in a non-dedicated system memory; and means for writing the current picture in the dedicated chip memory or the non-dedicated system memory based on the determination of whether to write the current picture in the dedicated chip memory or whether to write the current picture the non-dedicated system memory.

Clause 31A. The device of clause 30A, further comprising means for performing the method of any of clauses 1A-11A.

Clause 1B. A method of processing video data, the method comprising: generating a portion of a respective reference picture list for each of a plurality of future pictures, the plurality of future pictures follow a current picture in coding order; determining a first future reference count value based on a number of times the current picture is identified among the portions of the respective reference picture lists for the plurality of future pictures; determining a second future reference count value based on a number of times a cached picture stored in a dedicated chip memory is identified in the portion of the respective reference picture list for each of the plurality of future pictures; determining whether to write the current picture in the dedicated chip memory or a non-dedicated system memory based on at least the first future reference count value and the second future reference count value; and writing the current picture in the dedicated chip memory or the non-dedicated system memory based on the determination of whether to write the current picture in the dedicated chip memory or the non-dedicated system memory.

Clause 2B. The method of clause 1B, wherein the current picture and the plurality of future pictures are part of a current set of pictures having a defined number of pictures, the method further comprising: determining a respective previous picture in a previous set of pictures located in a same relative coding order location in the previous set of pictures that each of the plurality of the future pictures is located in the current set of pictures, wherein the previous set of pictures include the defined number of pictures, and wherein pictures in the previous set of pictures are encoded or decoded before pictures in the current set of pictures; determining the portion of a respective reference picture list for the respective previous picture in the previous set of pictures; and generating the portion of the respective reference picture list for each of the plurality of future pictures based on the determined portion of the respective reference picture list for the respective previous picture in the previous set of pictures.

Clause 3B. The method of any of clauses 1B and 2B, wherein the portion of the respective reference picture list comprises respective reference picture identified at a first index in the respective reference picture list, the method further comprising: determining which reference picture is identified at the first index in the respective reference picture list for each of the plurality of future pictures; determining the first future reference count value based on the number of times the current picture is identified at the first index in the respective reference picture list for each of the plurality of future pictures; and determining the second future reference count value based on the number of times the cached picture is identified at the first index in the respective reference picture list for each of the plurality of future pictures.

Clause 4B. The method of any of clauses 1B-3B, further comprising: determining a first reference benefit value for the current picture based on the first future reference count value, the first reference benefit value being indicative of a predicted frequency that the current picture will be used for inter-predicting; determining a second reference benefit value for the cached picture based on the second future reference count value, the second reference benefit value being indicative of a predicted frequency that the cached picture will be used for inter-predicting; wherein determining whether to write the current picture in the dedicated chip memory or the non-dedicated system memory comprises determining whether to write the current picture in the dedicated chip memory or the non-dedicated system based on the first reference benefit value or the second reference benefit value.

Clause 5B. The method of any of clauses 1B-4B, wherein the respective reference picture list is a first respective reference picture list, the method further comprising: generating a portion of a second respective reference picture list for each of the plurality of future pictures; determining a third future reference count value based on a number of times the current picture is identified in the portion of the second respective reference picture list for each of the plurality of future pictures; determining a fourth future reference count value based on a number of times the cached picture is identified in the portion of the second respective reference picture list for each of the plurality of future pictures; and determining whether to write the current picture in the dedicated chip memory or the non-dedicated system memory based on at least the first future reference count value, the second future reference count value, the third future reference count value, and the fourth future reference count value.

Clause 6B. The method of any of clauses 1B-5B, wherein the portion of the respective reference picture list comprises respective reference picture identified at a first index in the respective reference picture list and respective reference picture identified at a second index in the respective reference picture list, the method further comprising: determining the first future reference count value based on the number of times the current picture is identified at the first index in the respective reference picture list for each of the plurality of future pictures; determining the second future reference count value based on the number of times the cached picture is identified at the first index of the respective reference picture list for each of the plurality of future pictures; determining a third future reference count value based on a number of times the current picture is identified at the second index in the respective reference picture list for each of the plurality of future pictures; determining a fourth future reference count value based on a number of times the cached picture is identified at the second index in the respective reference picture list for each of the plurality of future pictures; and determining whether to write the current picture in the dedicated chip memory or the non-dedicated system memory based on at least the first future reference count value, the second future reference count value, the third future reference count value, and the fourth future reference count value.

Clause 7B. The method of clause 6B, further comprising: generating a portion of a second respective reference picture list for each of the plurality of future pictures, the portion of the second respective reference picture list comprises respective reference picture identified at a first index in the second respective reference picture list and respective reference picture identified at a second index in the second respective reference picture list; determining a fifth future reference count value based on a number of times the current picture is identified at the first index in the second respective reference picture list; determining a sixth future reference count value based on a number of times the cached picture is identified at the first index in the second respective reference picture list; determining a seventh future reference count value based on a number of times the current picture is identified at the second index in the second respective reference picture list; determining an eighth future reference count value based on a number of times the cached picture is identified at the second index in the second reference picture list; and determining whether to write the current picture in the dedicated chip memory or the non-dedicated system memory based on at least the first future reference count value, the second future reference count value, the third future reference count value, the fourth reference count value, the fifth future reference count value, the sixth future reference count value, the seventh future reference count value, and the eighth future reference count value.

Clause 8B. The method of clause 7B, further comprising: applying a respective weight to each of the first future reference count value, the third future reference count value, the fifth future reference count value, and the seventh future reference count value to determine a first reference benefit value for the current picture indicative a predicted frequency that the current picture will be accessed from the dedicated chip memory; applying a respective weight to each of the second future reference count value, the fourth future reference count value, the sixth future reference count value, and the eighth future reference count value to determine a second reference benefit value for the cached picture indicative of a predicted frequency that the cached picture will be accessed from the dedicated chip memory; and determining whether to write the current picture in the dedicated chip memory or the non-dedicated system memory based on at least the first future reference count value and the second future reference count value.

Clause 9B. The method of any of clauses 1B-8B, further comprising: storing the current picture in the dedicated chip memory; determining that the current picture stored in the dedicated chip memory is for inter-prediction encoding or decoding a future picture of the plurality of future pictures; retrieving the current picture from the dedicated chip memory; and inter-prediction encoding or decoding the future picture based on the retrieved current picture.

Clause 10B. A device comprising memory and processing circuitry configured to perform the method of any of clauses 1B-9B.

Clause 11B. A computer-readable storage medium storing instructions there on that when executed cause one or more processors to perform the method of any of clauses 1B-9B.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of Ics (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
    generating a plurality of future reference picture lists associated with a plurality of future pictures of a set of pictures, wherein the set of pictures includes a current picture and the plurality of future pictures, and the plurality of future pictures follow the current picture in coding order;
    deriving a first metric from a number of times the current picture is identified among the plurality of future reference picture lists associated with the plurality of future pictures;
    deriving a second metric associated with a cached picture stored in the dedicated chip memory based on the plurality of future reference picture lists associated with the plurality of future pictures;
    determining whether to write the current picture in a dedicated chip memory or in a non-dedicated system memory based on a comparison between the first metric and the second metric; and
    writing the current picture in the dedicated chip memory or in the non-dedicated system memory based on the determination of whether to write the current picture in the dedicated chip memory or in the non-dedicated system memory.

2. The method of claim 1, wherein the set of pictures comprises a second set of pictures, wherein generating the plurality of future reference picture lists comprises generating, based on a first set of pictures coded prior to the second set of pictures, the plurality of future reference picture lists associated with the plurality of future pictures, and wherein writing the current picture comprises writing the current picture after or during inter-prediction decoding of the current picture.

3. The method of claim 2, wherein generating the plurality of future reference picture lists comprises:
determining respective previous pictures in the first set of pictures located in a same relative coding order location in the first set of pictures that the plurality of the future pictures are located in the second set of pictures;
determining respective reference picture lists for the respective previous pictures; and
generating respective plurality of future reference picture lists for each of the plurality of future pictures based on the determined respective reference picture lists for the respective previous pictures.

4. The method of claim 1, wherein the set of pictures includes the current picture, the plurality of future pictures, and one or more additional pictures.

5. The method of claim 1, wherein determining whether to write the current picture in the dedicated chip memory or in the non-dedicated system memory comprises determining whether to write the current picture in the dedicated chip memory or in the non-dedicated system memory prior to encoding or decoding the current picture.

6. The method of claim 1 further comprising comparing the first metric and the second metric.

7. The method of claim 1, wherein determining whether to write the current picture in the dedicated chip memory or in the non-dedicated system memory comprises determining to write the current picture in the dedicated chip memory based on the first metric being greater than the second metric.

8. The method of claim 1, further comprising:
reconstructing the current picture,
wherein writing the current picture comprises writing the current picture after or during the reconstruction of the current picture.

9. The method of claim 8, wherein reconstructing the current picture comprises reconstructing the current picture as part of a reconstruction loop for video encoding.

10. The method of claim 1, wherein determining whether to write the current picture in the dedicated chip memory or in the non-dedicated system memory comprises determining to write the current picture in the dedicated chip memory, the method further comprising:
determining that the current picture is a reference picture for a future picture of the future pictures; and
reconstructing the future picture based on accessing the current picture from the dedicated chip memory.

11. A device for processing video data, the device comprising:
a dedicated chip memory; and
processing circuitry coupled to the dedicated chip memory and configured to:
generate a plurality of future reference picture lists associated with a plurality of future pictures of a set of pictures, wherein the set of pictures includes a current picture and the plurality of future pictures, and the plurality of future pictures follow the current picture in coding order;
derive a first metric from a number of times the current picture is identified among the plurality of future reference picture lists associated with the plurality of future pictures;
derive a second metric associated with a cached picture stored in the dedicated chip memory based on the plurality of future reference picture lists associated with the plurality of future pictures;
determine whether to write the current picture in the dedicated chip memory or in a non-dedicated system memory based on a comparison between the first metric and the second metric; and
write the current picture in the dedicated chip memory or in the non-dedicated system memory based on the determination of whether to write the current picture in the dedicated chip memory or in the non-dedicated system memory.

12. The device of claim 11, wherein the set of pictures comprises a second set of pictures, wherein to generate the plurality of future reference picture lists, the processing circuitry is configured to generate, based on a first set of pictures coded prior to the second set of pictures, the plurality of future reference picture lists associated with the plurality of future pictures, and wherein to write the current picture, the processing circuitry is configured to write the current picture after or during inter-prediction decoding of the current picture.

13. The device of claim 12, wherein to generate the plurality of future reference picture lists, the processing circuitry is configured to:
determine respective previous pictures in the first set of pictures located in a same relative coding order location in the first set of pictures that the plurality of the future pictures are located in the second set of pictures;
determine respective reference picture lists for the respective previous pictures; and
generate respective plurality of future reference picture lists for each of the plurality of future pictures based on the determined respective reference picture lists for the respective previous pictures.

14. The device of claim 11, wherein the set of pictures includes the current picture, the plurality of future pictures, and one or more additional pictures.

15. The device of claim 11, wherein to determine whether to write the current picture in the dedicated chip memory or in the non-dedicated system memory, the processing circuitry is configured to determine whether to write the current picture in the dedicated chip memory or in the non-dedicated system memory prior to encoding or decoding the current picture.

16. The device of claim 11, wherein the processing circuitry is configured to compare the first metric and the second metric.

17. The device of claim 11, wherein to determine whether to write the current picture in the dedicated chip memory or in the non-dedicated system memory, the processing circuitry is configured to determine to write the current picture in the dedicated chip memory based on the first metric being greater than the second metric.

18. The device of claim 11, wherein the processing circuitry is configured to:
reconstruct the current picture,
wherein to write the current picture, the processing circuitry is configured to write the current picture after or during the reconstruction of the current picture.

19. The device of claim 18, wherein to reconstruct the current picture, the processing circuitry is configured to reconstruct the current picture as part of a reconstruction loop for video encoding.

20. The device of claim 11, wherein to determine whether to write the current picture in the dedicated chip memory or in the non-dedicated system memory, the processing circuitry is configured to determine to write the current picture in the dedicated chip memory, and wherein the processing circuitry is configured to:
   determine that the current picture is a reference picture for a future picture of the future pictures; and
   reconstruct the future picture based on accessing the current picture from the dedicated chip memory.

21. One or more non-transitory, computer-readable storage media storing instructions that when executed cause one or more processors to:
   generate a plurality of future reference picture lists associated with a plurality of future pictures of a set of pictures, wherein the set of pictures includes a current picture and the plurality of future pictures, and the plurality of future pictures follow the current picture in coding order;
   derive a first metric from a number of times the current picture is identified among the plurality of future reference picture lists associated with the plurality of future pictures;
   derive a second metric associated with a cached picture stored in the dedicated chip memory based on the plurality of future reference picture lists associated with the plurality of future pictures;
   determine whether to write the current picture in a dedicated chip memory or in a non-dedicated system memory based on a comparison between the first metric and the second metric; and
   write the current picture in the dedicated chip memory or in the non-dedicated system memory based on the determination of whether to write the current picture in the dedicated chip memory or in the non-dedicated system memory.

22. The one or more non-transitory, computer-readable storage media of claim 21, wherein the set of pictures comprises a second set of pictures, wherein the instructions that cause the one or more processors to generate the plurality of future reference picture lists comprise instructions that cause the one or more processors to generate, based on a first set of pictures coded prior to the second set of pictures, the plurality of future reference picture lists associated with the plurality of future pictures, and wherein the instructions that cause the one or more processors to write the current picture comprise instructions that cause the one or more processors to write the current picture after or during inter-prediction decoding of the current picture.

23. The one or more non-transitory, computer-readable storage media of claim 22, wherein the instructions that cause the one or more processors to generate the plurality of future reference picture lists comprise instructions that cause the one or more processors to:
   determine respective previous pictures in the first set of pictures located in a same relative coding order location in the first set of pictures that the plurality of the future pictures are located in the second set of pictures;
   determine respective reference picture lists for the respective previous pictures; and
   generate respective plurality of future reference picture lists for each of the plurality of future pictures based on the determined respective reference picture lists for the respective previous pictures.

24. The one or more non-transitory, computer-readable storage media of claim 21, wherein the instructions that cause the one or more processors to determine whether to write the current picture in the dedicated chip memory or in the non-dedicated system memory comprise instructions that cause the one or more processors to determine whether to write the current picture in the dedicated chip memory or in the non-dedicated system memory prior to encoding or decoding the current picture.

25. The one or more non-transitory, computer-readable storage media of claim 21, wherein the instructions further comprise instructions that cause the one or more processors to compare the first metric and the second metric.

* * * * *